(12) United States Patent  
Jayaraman et al.

(10) Patent No.: US 12,556,115 B2
(45) Date of Patent: Feb. 17, 2026

(54) REDUCTION OF CURRENT RIPPLE DUE TO MOSFET SWITCHING DELAYS IN PWM-BASED DRIVES

(71) Applicant: Woodward, Inc., Fort Collins, CO (US)

(72) Inventors: Ganga P. Jayaraman, Buffalo Grove, IL (US); Dragan Micic, Mount Prospect, IL (US)

(73) Assignee: Woodward, Inc., Fort Collins, CO (US)

( * ) Notice: Subject to any disclaimer, the term of this patent is extended or adjusted under 35 U.S.C. 154(b) by 183 days.

(21) Appl. No.: 18/007,691

(22) PCT Filed: Jun. 3, 2020

(86) PCT No.: PCT/US2020/035978
§ 371 (c)(1),
(2) Date: Dec. 1, 2022

(87) PCT Pub. No.: WO2021/247021
PCT Pub. Date: Dec. 9, 2021

(65) Prior Publication Data
US 2023/0246572 A1    Aug. 3, 2023

(51) Int. Cl.
*H02P 7/29* (2016.01)
*H02P 6/28* (2016.01)

(52) U.S. Cl.
CPC . *H02P 7/29* (2013.01); *H02P 6/28* (2016.02)

(58) Field of Classification Search
CPC .. H02P 6/28; H02P 7/29; H02P 27/08; H02M 7/5395
See application file for complete search history.

(56) References Cited

U.S. PATENT DOCUMENTS

| 4,999,552 A | 3/1991 | Siepelt |
| 6,215,288 B1 | 4/2001 | Ramsey et al. |

(Continued)

FOREIGN PATENT DOCUMENTS

| CN | 104136758 A | 11/2014 |
| CN | 109889045 | 6/2019 |

(Continued)

OTHER PUBLICATIONS

International Preliminary Report on Patentability in International Application No. PCT/US2020/035978, mailed on Dec. 15, 2022, 11 pages.

(Continued)

*Primary Examiner* — Said Bouziane
(74) *Attorney, Agent, or Firm* — Fish & Richardson P.C.

(57) ABSTRACT

The subject matter of this specification can be embodied in, among other things, a method that includes receiving a first electrical current output setpoint, identifying a first operational condition based on the first electrical current output setpoint, providing, based on the identified first operational condition, a first pulse width modulated (PWM) signal having a first predetermined duty cycle, based on the first electrical current output setpoint, provided on a predetermined period, receiving a second electrical current output setpoint, identifying a second operational condition different from the first operational condition based on the second electrical current output setpoint, and providing, based on the identified second operational condition, a second PWM signal having a second predetermined duty cycle, based on the second electrical current output setpoint, provided on a predetermined multiple of the predetermined period.

28 Claims, 11 Drawing Sheets

(56) References Cited

U.S. PATENT DOCUMENTS

| | | |
|---|---|---|
| 6,747,441 B2 | 6/2004 | Johnson et al. |
| 6,912,139 B2 | 6/2005 | Kernahan et al. |
| 7,298,124 B2 | 11/2007 | Kan et al. |
| 7,339,327 B2 | 3/2008 | O'Gorman et al. |
| 7,368,897 B2 | 5/2008 | Qahouq et al. |
| 7,456,624 B2 | 11/2008 | Sheng et al. |
| 7,592,791 B2 | 9/2009 | Emira |
| 8,164,319 B2 | 4/2012 | Bodano et al. |
| 8,213,193 B2 | 7/2012 | Ye |
| 8,363,430 B2 | 1/2013 | Ye |
| 8,427,123 B2 | 4/2013 | Dearborn |
| 8,587,268 B1 | 11/2013 | Huard |
| 8,779,740 B2 | 7/2014 | Marsili et al. |
| 8,780,590 B2 | 7/2014 | So et al. |
| 8,907,642 B1 | 12/2014 | Burstein et al. |
| 9,124,177 B2 | 9/2015 | Zhu et al. |
| 9,270,190 B2 | 2/2016 | Ganesh Kumar |
| 9,276,477 B2 | 3/2016 | Thomas et al. |
| 9,407,145 B1 | 8/2016 | Burstein et al. |
| 9,467,049 B2 | 10/2016 | Ju |
| 9,647,558 B2 | 5/2017 | Houston et al. |
| 9,819,268 B2 | 11/2017 | Thomas et al. |
| 10,008,924 B1 | 6/2018 | Turchi et al. |
| 10,114,386 B2 | 10/2018 | Summers et al. |
| 10,122,278 B1 | 11/2018 | Xue et al. |
| 10,511,225 B1 | 12/2019 | de Marco |
| 10,511,230 B2 | 12/2019 | Phadke |
| 10,517,152 B2 | 12/2019 | Ekbote et al. |
| 10,547,240 B2 | 1/2020 | Arbetter |
| 2004/0095164 A1 | 5/2004 | Kernahan et al. |
| 2004/0174152 A1 | 9/2004 | Hwang et al. |
| 2006/0083037 A1 | 4/2006 | Leung et al. |
| 2014/0042948 A1 | 2/2014 | Green et al. |
| 2016/0308482 A1* | 10/2016 | Becker .................. H02P 27/085 |
| 2017/0237347 A1 | 8/2017 | Houston et al. |
| 2018/0219472 A1* | 8/2018 | Hesterman ............. H02M 1/12 |
| 2019/0013748 A1 | 1/2019 | Barrenscheen et al. |
| 2019/0123646 A1 | 4/2019 | Tarroboiro et al. |

FOREIGN PATENT DOCUMENTS

| | | |
|---|---|---|
| EP | 3018820 | 5/2016 |
| WO | WO 2013080610 | 6/2013 |

OTHER PUBLICATIONS

International Search Report and Written Opinion in International Application No. PCT/US2020/035978, mailed on Feb. 26, 2021, 15 pages.

Peterchev et al., "Digital Multimode Buck Converter Control With Loss-Minimizing Synchronous Rectifier Adaptation," IEEE Transactions on Power Electronics, Nov. 2006, 21(6): 1588-1599.

Communication Pursuant to Article 94(3) EPC in European Patent Application No. EP 20747249.9, dated Apr. 10, 2024, 10 pages.

Office Action in Chinese Patent Application No. 202080101722.X, mailed on Jul. 25, 2025, 45 pages (with English translation).

* cited by examiner

REDUCTION OF CURRENT RIPPLE DUE TO MOSFET SWITCHING DELAYS IN PWM-BASED DRIVES

CROSS-REFERENCE TO RELATED APPLICATION(S)

This application is a U.S. National Phase Application under 35 U.S.C. § 371 and claims the benefit of priority to International Application Serial No. PCT/US2020/035978, filed Jun. 3, 2020, the contents of which are hereby incorporated by reference.

TECHNICAL FIELD

This instant specification relates to pulse width modulation (PWM) control systems.

BACKGROUND

Pulse width modulation (PWM), or pulse duration modulation (PDM), is a method of reducing the average power delivered by an electrical signal. In general, an electrical signal is chopped into a stream of discrete pulses that are sent at a set frequency. PWM is particularly suited for running loads such as motors, which are not as easily affected by this discrete switching because they have inertia and react relatively slowly compared to the PWM frequency. PWM switching frequencies are set high enough such that the resultant waveform, as perceived by the load, is relatively smooth.

The width of the pulse (e.g., the duty cycle) relative to the duration of the cycle (e.g., the wavelength) can be varied. A 100% duty cycle effectively allows the electrical signal to stay "on" or "high" and effectively provides 100% of that signal's electrical current to a load. A 0% duty cycle effectively keeps the electrical signal "off" or "low" and effectively provides zero current to the load. A 50% duty cycle effectively provides 50% of the signal's current to the load, and so on.

The act of switching the PWM pulses on and off implements some form of high-speed, solid-state switching device. For current needs in the hundreds of amperes, IGBTs are generally used. For currents up to tens of amperes MOSFETs, which have lower losses and can handle higher frequencies, are generally used. When PWM-based amplifiers are used to drive brushless DC motors, the load requirements are usually large enough that the operating current is a few amperes and regulation near zero current is not common.

SUMMARY

In general, this document describes pulse width modulation (PWM) control systems.

In a first aspect, a computer-implemented method for electric current control comprises receiving a first electrical current output setpoint, identifying a first operational condition based on the first electrical current output setpoint, providing, based on the identified first operational condition, a first pulse width modulated (PWM) signal having a first predetermined duty cycle, based on the first electrical current output setpoint, provided on a predetermined period, receiving a second electrical current output setpoint, identifying a second operational condition different from the first operational condition based on the second electrical current output setpoint, and providing, based on the identified second operational condition, a second PWM signal having a second predetermined duty cycle, based on the second electrical current output setpoint, provided on a predetermined multiple of the predetermined period.

In a second aspect, according to aspect 1, providing the first PWM signal comprises determining a start of a PWM cycle having a first duration of time based on the predetermined period, providing an electrical signal, halting the electrical signal based on determining that the electrical signal has been provided for a second duration of time, based on the first predetermined duty cycle, has elapsed, and determining an end of the PWM cycle based on determining that the first duration of time has elapsed.

In a third aspect, according to aspect 1 or 2, providing the second PWM signal comprises determining a start of a first PWM cycle having a first duration of time based on the predetermined period, providing an electrical signal, halting the electrical signal based on determining that a second duration of time, based on the second predetermined duty cycle, has elapsed, determining an end of the first PWM cycle based on determining that the first duration of time has elapsed, determining the start of a predetermined number, based on the predetermined multiple, of second PWM cycles having the first duration of time based on the predetermined period, halting the electrical signal during the second PWM cycles, and determining the end of the predetermined number of second PWM cycles have occurred.

In a fourth aspect, according to aspect 3, the method further comprises determining the predetermined multiple based on the second operational condition.

In a fifth aspect, according to any of aspects 1 to 4, providing the second PWM signal comprises determining a start of a PWM cycle having a second duration of time based on the predetermined period and the predetermined multiple, providing an electrical signal, halting the electrical signal based on determining that a second duration of time, based on the second predetermined duty cycle, has elapsed, and determining an end of the PWM cycle based on determining that the second duration of time has elapsed.

In a sixth aspect, according to any one of aspects 1 to 5, providing the second PWM signal comprises generating a PWM pulse at a frequency based on the predetermined period, transmitting an electrical pulse based on the generated PWM pulse, and ignoring a predetermined number of PWM pulses based on the predetermined multiple.

In a seventh aspect, according to any one of aspects 1 to 6, identifying the first operational condition is based on determining a target duty cycle based on the first electrical current output setpoint, determining that the target duty cycle is equal to or longer than a predetermined threshold duty cycle, and providing the target duty cycle as the first predetermined duty cycle.

In an eighth aspect, according to any one of aspects 1 to 7, identifying the second operational condition is based on determining a target duty cycle based on the second electrical current output setpoint, determining that the target duty cycle is shorter than a predetermined threshold duty cycle, and determining the second predetermined duty cycle based on the target duty cycle.

In a ninth aspect, according to any one of aspects 1 to 8, identifying the second operational condition is based on at least one of a minimum turn-on time of an electrical circuit configured to transmit the PWM signal, and a minimum turn-off time of the electrical circuit.

In a tenth aspect, a control system comprises an input configured to receive electrical current setpoints, a monitor circuit configured to identify at least a first operational condition and a second operational condition based on received electrical current setpoints, a pulse generator configured to generate an electrical pulse width modulated (PWM) signal comprising a plurality of PWM pulses based on received electrical current setpoints, a pulse inhibitor configured to modify the PWM signal by passing the PWM pulses based on the first operational condition, and by blocking selected PWM pulses of the PWM signal and passing non-selected PWM pulses based on the second operational condition, and a transmitter configured to transmit the modified PWM signal to a load.

In an eleventh aspect, according to aspect 10, the first operational condition is identified based on a first electrical current setpoint and the second operational condition is identified based a second electrical current setpoint, and the pulse generator is further configured to generate a first PWM signal based on the first electrical current setpoint and generate a second PWM signal based on the second electrical current setpoint.

In a twelfth aspect, according to aspect 10 or 11, the first operational condition is identified based on a first electrical current setpoint and the second operational condition is identified based a second electrical current setpoint, and the monitor circuit is further configured to identify a first operational condition based on the first electrical current setpoint and identify a second operational condition based on the second electrical current setpoint.

In a thirteenth aspect, according to any one of aspects 10 to 12, the monitor circuit is configured to identify one or both of the first operational condition and the second operational condition further based on one or more operational inputs that are descriptive of the load or operation of the load, wherein operation of the load is controlled based on the PWM signal.

In a fourteenth aspect, according to any one of aspects 10 to 13, the pulse inhibitor is configured to modify operation of the pulse generator to cause the pulse generator to withhold generation of selected PWM pulses of the PWM signal.

In a fifteenth aspect, according to any one of aspects 10 to 14, the pulse inhibitor is configured to modify operation of the pulse generator to cause the pulse generator to modify a frequency of the PWM signal.

In a sixteenth aspect, according to any one of aspects 10 to 15, the pulse inhibitor is configured to block selected PWM pulses generated by the pulse generator.

In a seventeenth aspect, according to any one of aspects 10 to 16, the selected PWM pulses are a predetermined number of sequential PWM pulses.

In an eighteenth aspect, according to aspect 17, the predetermined number of sequential PWM pulses is based on the second operational condition.

In a nineteenth aspect, a non-transitory computer storage medium encoded with a computer program, the computer program comprising instructions that when executed by data processing apparatus cause the data processing apparatus to perform operations comprising receiving a first electrical current output setpoint, identifying a first operational condition based on the first electrical current output setpoint, providing, based on the identified first operational condition, a first pulse width modulated (PWM) signal having a first predetermined duty cycle, based on the first electrical current output setpoint, provided on a predetermined period, receiving a second electrical current output setpoint, identifying a second operational condition different from the first operational condition based on the second electrical current output setpoint, and providing, based on the identified second operational condition, a second PWM signal having a second predetermined duty cycle, based on the second electrical current output setpoint, provided on a predetermined multiple of the predetermined period.

In a twentieth aspect, according to aspect 19, providing the first PWM signal comprises determining a start of a PWM cycle having a first duration of time based on the predetermined period, providing an electrical signal, halting the electrical signal based on determining that a second duration of time, based on the first predetermined duty cycle, has elapsed, and determining an end of the PWM cycle based on determining that the first duration of time has elapsed.

In a twenty-first aspect, according to aspect 19 or 20, providing the second PWM signal comprises determining a start of a first PWM cycle having a first duration of time based on the predetermined period, providing an electrical signal, halting the electrical signal based on determining that a second duration of time, based on the second predetermined duty cycle, has elapsed, determining an end of the first PWM cycle based on determining that the first duration of time has elapsed, determining the start of a predetermined number, based on the predetermined multiple, of second PWM cycles having the first duration of time based on the predetermined period, halting the electrical signal during the second PWM cycles, and determining the end of the predetermined number of second PWM cycles have occurred.

In a twenty-second aspect, according to aspect 21, the operations further comprise determining the predetermined multiple based on the second operational condition.

In a twenty-third aspect, according to any one of aspects 19 to 22, providing the second PWM signal comprises determining a start of a PWM cycle having a second duration of time based on the predetermined period and the predetermined multiple, providing an electrical signal, halting the electrical signal based on determining that a second duration of time, based on the second predetermined duty cycle, has elapsed, and determining an end of the PWM cycle based on determining that the second duration of time has elapsed.

In a twenty-fourth aspect, according to any one of aspects 19 to 23, providing the second PWM signal comprises generating a PWM pulse at a frequency based on the predetermined period, transmitting an electrical pulse based on the generated PWM pulse, and ignoring a predetermined number of PWM pulses based on the predetermined multiple.

In a twenty-fifth aspect, according to any one of aspects 19 to 24, identifying the first operational condition is based on determining a target duty cycle based on the first electrical current output setpoint, determining that the target duty cycle is equal to or longer than a predetermined threshold duty cycle, and providing the target duty cycle as the first predetermined duty cycle.

In a twenty-sixth aspect, according to any one of aspects 19 to 25, identifying the second operational condition is based on determining a target duty cycle based on the second electrical current output setpoint, determining that the target duty cycle is shorter than a predetermined threshold duty cycle, and determining the second predetermined duty cycle based on the target duty cycle.

In a twenty-seventh aspect, according to any one of aspects 19 to 26, identifying the second operational condition is based on at least one of a minimum turn-on time of an electrical circuit configured to transmit the PWM signal, and a minimum turn-off time of the electrical circuit.

The systems and techniques described here may provide one or more of the following advantages. First, a system can provide PWM control at near-zero outputs. Second, the system can improve the stability of load control at near-zero outputs. Third, the system can reduce current ripple of PWM outputs at near-zero outputs. Fourth, the system can reduce audible ringing and/or chatter in mechanical outputs driven by PWM signals at near-zero outputs.

The details of one or more implementations are set forth in the accompanying drawings and the description below. Other features and advantages will be apparent from the description and drawings, and from the claims.

DETAILED DESCRIPTION

Figure 1:
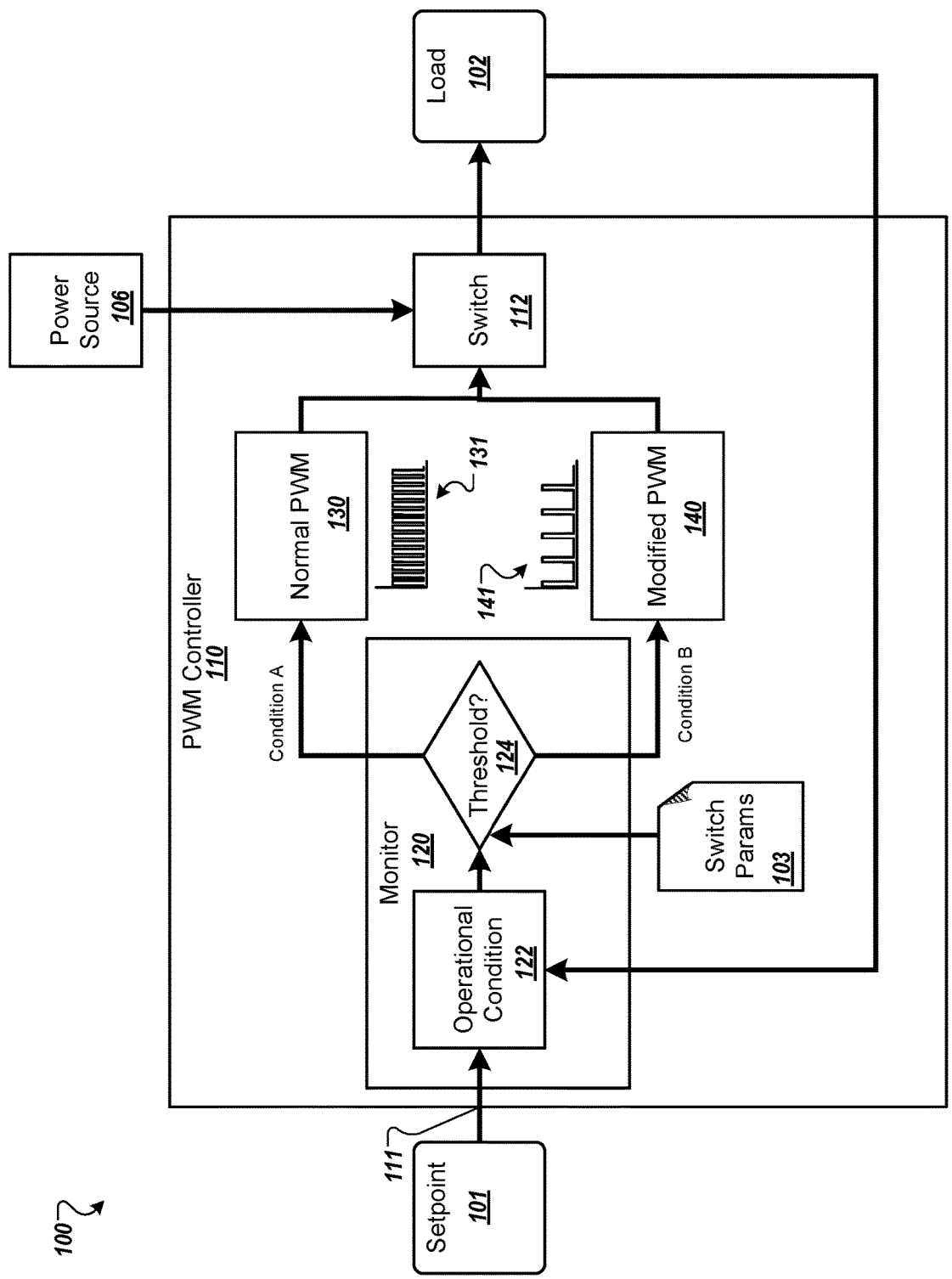
FIG. 1 is a schematic diagram that shows an example of a system for pulse width modulation (PWM) control in accordance with some embodiments in this document.

This document describes systems and techniques for electrical pulse width modulation (PWM) or pulse duration modulation (PDM) control systems. In general, the techniques described in this document overcome problems that occur as a byproduct of providing very short PWM pulses (e.g., near zero output) to solid-state switching and/or amplification stages. In general, these problems are overcome by identifying conditions in which PWM duty cycle widths have dropped below a predetermined minimum threshold, and responding by skipping or blocking the transmission of a predetermined number of pulses before transmitting the next PWM pulse (e.g., sending one PWM pulse every "X" PWM cycles when the PWM pulse width is determined to be less than "Y" milliseconds long).

In some embodiments, these techniques can be used for controlling the amount of electrical current that is provided in order to drive torque motors used in electrohydraulic servo valves (EHSVs). These EHSVs are generally two-stage hydraulic control valves that can be used to drive linear or rotary hydraulic actuators that move aircraft control surfaces. However, in some other embodiments, these control techniques could be used for other types of motors or solenoids also.

In general, this document describes systems and techniques that overcome problems related to PWM switching limitations of MOSFETs and other solid-state devices at very low currents. Many existing applications use a linear amplifier using discrete analog electronic components to drive the current in the EHSV torque motors. Even though linear amplifiers are not as efficient as PWM-based amplifiers, the current requirements for an EHSV with low flow ratings is small enough that the losses in the amplifier may not present a matter of concern. However, for bigger EHSVs or in a direct drive EHSV where the torque motor drives the spool valve directly, the current requirements can be much larger and can prompt the use of a PWM-based amplifier. From an electronic design perspective, a PWM-based amplifier can offload the proportional-integral (PI) control to software, and can leverage features of a microcontroller to control the output waveform. This can result in the use of fewer parts and better integration, and hence lower cost and improved reliability.

Solid-state devices vary in their switching speeds, and each configuration of device can have a minimum turn-on time and a minimum turn-off time. The minimum turn-on time corresponds to the pulse width needed to turn on a MOSFET from an off state, whereas the minimum turn-off time corresponds to the minimum time taken by the MOSFET to completely turn off once the pulse width is zero (e.g., voltage is removed from its gate). This turn-off time ends up corresponding to the minimum duty ratio that can be used to command the MOSFET. These turn-on and turn-off times are relatively short (e.g., milliseconds), and while higher quality devices can exhibit shorter times, all known solid-state switches still exhibit this behavior to some degree.

In an ideal system, PWM output is directly and smoothly proportional to the duty cycle (e.g., a 100% duty cycle gives 100% current, a 50% duty cycle gives 50% current, a 1% duty cycle gives 1% current). However, due to the switching limitations of real-world solid-state switches, actual PWM outputs can lose linearity and/or stability near the zero current point (e.g., under conditions in which sufficiently short duty cycles are to be used). As the duty cycle of the pulses being used to drive the gate of a MOSFET become shorter than the minimum turn-off time of the MOSFET, the MOSFET can produce output pulses having the (e.g., relatively longer) minimum turn-off time, rather than the (e.g., relatively shorter) commanded PWM duty cycle. In some examples, this behavior could resemble a plateauing or "bottoming out" of output current as a stream of duty cycles transitions from being longer than the minimum turn-off time (e.g., which can produce a proportional drop in output current), to being equal to or shorter than the minimum turn-off time (e.g., at least a portion of which can all produce the same output current based on the minimum turn-off time rather than the duty cycle).

When PWM-based amplifiers are used to drive brushless DC motors, the load requirements are usually large enough that the operating current is a few amperes and regulation near zero current is not common. In such applications, the PWM duty cycle (e.g., the portion of the overall PWM cycle in which the signal is turned "on") is generally longer than the minimum turn-off time of the switch of the amplifier.

However, when PWM-based amplifiers are used for controlling EHSV servos, the implementation may require regulation near zero current. In some applications, the PWM duty cycle may become shorter than the minimum turn-off time of the switch of the amplifier.

FIG. 1 is a schematic diagram that shows an example of a system 100 for pulse width modulation (PWM) control. The system 100 includes a PWM controller 110 that is configured to receive a setpoint value 101 (e.g., target output current, percent of output current) and provide a corresponding output signal to an electrical load 102 (e.g., an EHSV, an electric motor).

The PWM controller 110 includes a switch 112. The switch 112 is a solid-state switching device, such as a MOSFET-backed H-bridge or IGBT, configured to act as a PWM signal transmitter to transmit PWM signals to the electrical load 102. The switch 112 has an inherent minimum turn-on time and a minimum turn-off time (e.g., based on the physics of its underlying solid-state construction). For example, once the controlling signal is turned off, the switch 112 may remain on for at least a predetermined amount of time even if the control signal is removed before that time has elapsed. In another example, once turned off the switch 112 may remain off unless the turn-on signal is provided for at least a predetermined amount of time. This turn-on time is usually much smaller than the turn-off time (e.g., 0.025 microseconds compared to 2 microseconds).

In an example, a selected MOSFET can have finite turn-on and turn-off times, such as $T_{on}$=22 nsec and $T_{off}$=2 usec. For a 10 kHz PWM frequency, this implies a "minimum" duty ratio command from the gate drive circuit of 0.022% to turn the MOSFET on. Any duty ratio greater than 0.022% and less than 2% causes an effective duty ratio of 2% due to the finite Toff. In the presence of this nonlinearity, a proportional-integral (PI) controller can become unstable for values of current commands in the −10 mA to +10 mA range. In essence, the PI controller does not "know" about the deadband and offset in the duty ratio command, so its integrator builds up until PI output changes sign. This causes the current to reverse direction in an effort to reduce the error. The cycle then repeats itself. In examples in which the current loop is running at 10 kHz, these oscillations can have a frequency of 1 kHz to 2 kHz and can create an audible noise and vibration in a torque motor. The problem can become more severe as PWM voltages increase since duty ratios become proportionally smaller, e.g., duty ratios for a 28 VDC supply are generally smaller for an equivalent current output than when using 12 VDC supply.

Performance parameters such as these, and others, of the switch 112 can be known (e.g., based on manufacturers' specifications) or determined (e.g., measured), and used as a collection of predetermined switch parameters 103.

The switch 112 is configured to amplify a PWM driving signal by rapidly switching current from a power source 106 (e.g., electrical current received at a transistor source input) to the electrical load 102 (e.g., electrically connected to a transistor drain output) based on a PWM control signal (e.g., received at a transistor gate input). The PWM driving signal can be a normal PWM signal 131 generated by a normal PWM signal (e.g., pulse) generator module 130, or the PWM driving signal can be a modified PWM signal 141 generated by a modified PWM signal (e.g., pulse) generator 140. In general, the normal PWM signal is a PWM signal that has a predetermined cycle or frequency and in which non-zero values are represented by one electrical pulse during each cycle, and the modified PWM signal is a PWM signal that has the predetermined cycle or frequency but for some non-zero values does not transmit an electrical pulse for each cycle. An example of a normal PWM signal is discussed further in the description of FIG. 2A, and examples of modified PWM signals are discussed further in the descriptions of FIGS. 2B and 2C.

The determination for whether to present a normal or modified PWM signal to the switch 112 is performed by a monitor module 120. In some implementations, the monitor module 120 can be a software algorithm performed by a processor, or it can be a function performed by a dedicated electronic circuit. The monitor module 120 includes an operational condition identification module 122 and a threshold module 124.

The operational condition identification module 122 is configured to determine the duty cycle of the PWM signal to be produced (e.g., for amplification by the switch 112) based on the setpoint value 101 received at an input port 111. The PWM controller 110 is configured to provide a range of high power levels (e.g., 0-10 A, 0-100 A) from the switch 112 to the electrical load 102 based on a low power (e.g., 0-5V, 0-10V, −10 mA to +10 mA) or digital signal that is provided to the PWM controller 110 to represent the setpoint value 101.

The operational condition identification module 122 is also configured to receive feedback or other information about the electrical load 102, and use that information to determine the operational condition. For example, an electric actuator with no mechanical load may react to a selected PWM duty cycle differently than when the electric actuator is burdened with a high inertial load, and the operational condition identification module 122 may at least partly determine the operational condition or PWM duty cycle based on those conditions. In another example, two different mechanical loadings may behave differently to modified PWM signals (e.g., one load may audibly resonate or mechanically chatter whereas the other load may not, in response to the same modified PWM signal), and the operational condition identification module 122 may at least partly determine the operational condition or PWM duty cycle based on those conditions.

In some implementations, the operational condition identification module 122 can be configured to convert the setpoint value 101 into a PWM signal having a predetermined cycle and a duty cycle that is based on the setpoint value 101. For example, the setpoint value 101 may represent "10 percent", and the operational condition identification module 122 may respond by determining that the corresponding duty cycle is 10% of the PWM cycle, and by determining duration of PWM pulses that correspond to a 10% duty cycle. In such an example, the operational condition identification module 122 can determine that for a 10 kHz PWM frequency the PWM cycle or frame time will be 0.0001 seconds long, and that a 10% duty cycle will result in PWM pulses having a 0.00001-second duration on a 0.0001-second interval). Such pulses control the amount of power switched by the switch 112 from the power source 106 to the electrical load 102 (e.g., 10% of the power available from the power source 106 in this example). Similarly, a setpoint value of 90% can cause the operational condition identification module 122 to determine that a 90% duty cycle is appropriate, and may determine that a 90% duty cycle will result in a PWM signal having pulses that are of a different duration (e.g., 0.0009 seconds long for a PWM frequency of 1 kHz).

In some embodiments, the operational condition identification module 122 can be configured to measure the pulse durations of an existing PWM signal. For example, the operational condition identification module 122 can be configured downstream from a PWM signal generator (e.g., instead of upstream from the PWM signal generators 130 and 140, as in the illustrated example). In some embodiments, arranging the operational condition identification module 122 upstream to PWM signal generation may be useful for new controller designs, while arranging the operational condition identification module 122 downstream from PWM signal general may be useful for enhancing or retrofitting existing controller designs.

The threshold module 124 is configured to compare the determined duration of PWM pulses against the predetermined switch parameters 103. The predetermined switch parameters 103 provide information that describes characteristics of the switch 112, including the minimum turn-on time of the switch 112. In some implementations, the predetermined switch parameters 103 can be provided directly, e.g., the predetermined switch parameters 103 can include an explicit value that describes the minimum turn-on time of the switch 112. In some implementations, the predetermined switch parameters 103 can be provided indirectly, e.g., the predetermined switch parameters 103 can include values that describe construction, type, make and model, or other information that identifies the switch 112, and the minimum turn-on time of the switch 112 can be determined (e.g., looked up, calculated) based on that information.

The threshold module 124 compares the determined duration of PWM pulses against the minimum turn-off time for the switch 112 to determine if the target PWM duty cycle results in PWM pulses that are equal to or longer than the minimum turn-off time for the switch 112, or if the target PWM duty cycle results in PWM pulses that are shorter than the minimum turn-on time for the switch 112 (e.g., PWM duty cycles that are too short for the switch 112 to follow accurately).

If the threshold module determines that the PWM pulse durations are equal to or longer than the minimum turn-off time of the switch 112 (e.g., the switch 112 can follow the pulses accurately), then the normal PWM signal generator 130 is engaged to generate and provide the normal PWM signal 131 to the switch. However, if the threshold module determines that the PWM pulse durations are shorter than the minimum turn-off time of the switch 112 (e.g., the switch 112 cannot follow the pulses accurately), then the modified PWM signal generator 140 is engaged to generate and provide the modified PWM signal 141 to the switch.

Figure 2A:
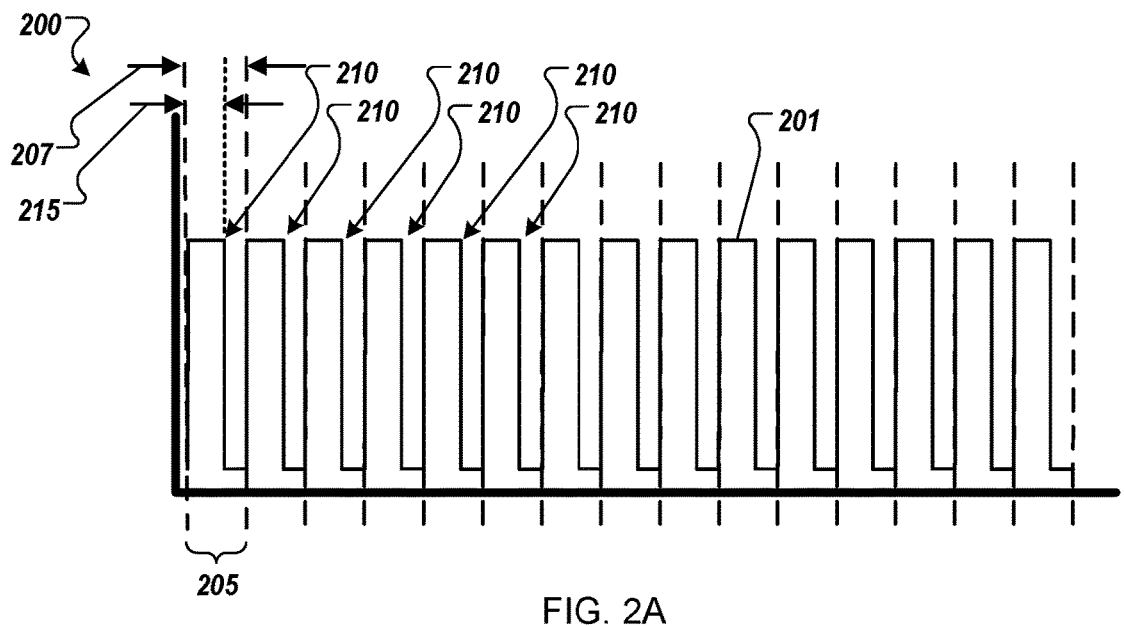
FIG. 2A is a graph of an example PWM waveform.

FIG. 2A is a graph 200a of an example PWM waveform 201a. In some implementations, the PWM waveform 201a can be the example normal PWM signal 131 of FIG. 1.

The PWM waveform 201a is a stream of PWM cycles 205a. Each of the PWM cycles 205a have a predetermined PWM cycle period 207a. At the start of the PWM cycle 205a, the PWM waveform 201a is brought high (e.g., signal power is turned on), and when the predetermined PWM cycle period 207a has elapsed the PWM waveform 201 is brought low (e.g., signal power is turned off) and remains low until the PWM cycle period 207 has elapsed, then the process repeats. For example, a PWM signal having a 100 Hz frequency will have a 10 ms cycle period (e.g., 1/100th of a second equals 10 ms). Typically, PWM signals are transmitted at substantially fixed, predetermined frequencies.

For non-zero PWM values, each of the PWM cycles 205 includes a PWM pulse 210. Each of the PWM pulses 210 has a duty cycle, which is a fraction or percentage of the PWM cycle period 207. The duty cycle determines the duration or period of the PWM pulse and in the illustrated example the PWM pulse duration is represented as 215. For example, for a PWM signal having a 50% duty cycle, the length of the PWM pulse duration 215 will be 50% of the length of time of the PWM cycle period 207. In another example, for a PWM signal having a 100 Hz frequency and a 50% duty cycle, the PWM pulses will be 5 ms long (e.g., 50% of the 10 ms period equals 5 ms). For simplicity of illustration of explanation, the PWM waveform 201 represents a single value that is being transmitted for the illustrated duration of the PWM waveform 201.

Figure 2B:
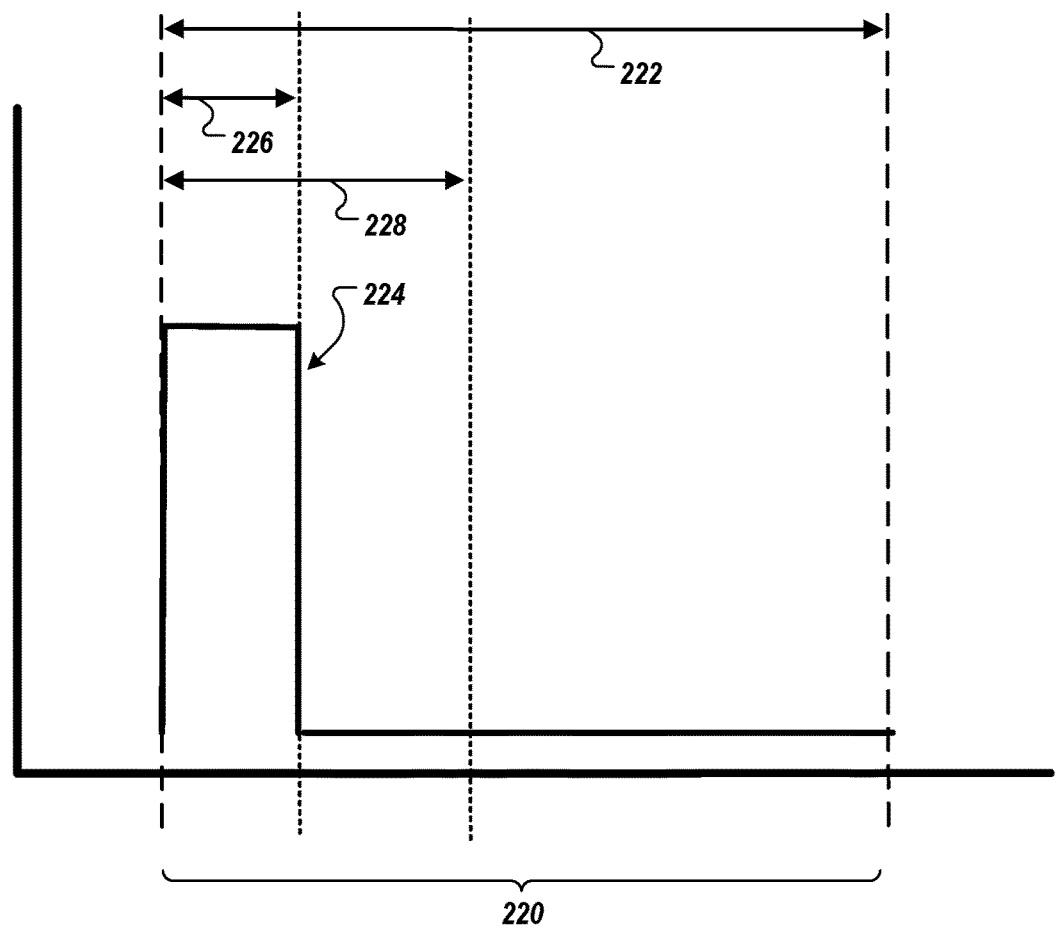
FIG. 2B is an enlarged view of an example PWM cycle.

FIG. 2B is a graph of an example PWM cycle 220. In some embodiments, the PWM cycle 220 can be an enlarged view of one of the PWM cycles 205. The PWM cycle has a PWM cycle period 222 and a PWM pulse 224. The PWM pulse has a PWM pulse duration 226. A threshold period 228 represents an example minimum turn-on time of a switching amplifier (e.g., the example switch 112 of FIG. 1).

In the illustrated example, the selected duty cycle of the PWM cycle 220 causes the PWM pulse duration 226 to be shorter than the threshold period 228. In some examples, unless further steps are taken, the pulses provided by the switching amplifier can have a duration that approximates the threshold period 228 and not the PWM pulse duration 226. As a result, in the absence of additional remediation, the actual output of the switching amplifier can become disproportional to the commanded output. For example, a high current based on a high PWM duty cycle can decrease proportionally with decreasing PWM duty cycles until the PWM duty cycle duration substantially equals the threshold period 228. As the PWM duty cycle continues to decrease, the amplified current output can remain at the level caused by the switching amplifier's minimum turn-off period, as represented by the threshold period 228. Under such conditions, and in the absence of additional remediation, the output of the switching amplifier will be higher than the commanded output level and will become increasingly more erroneous as the commanded output level approaches zero.

In situations in which the PWM pulse duration 226 is determined (e.g., by the example monitor circuit of FIG. 1) to have a duration that is less than (or equal to or less than) the threshold period 228, a modified PWM signal is provided to the switching amplifier (e.g., the switch 112) to controllably adjust the output of the switching amplifier.

Figure 2C:
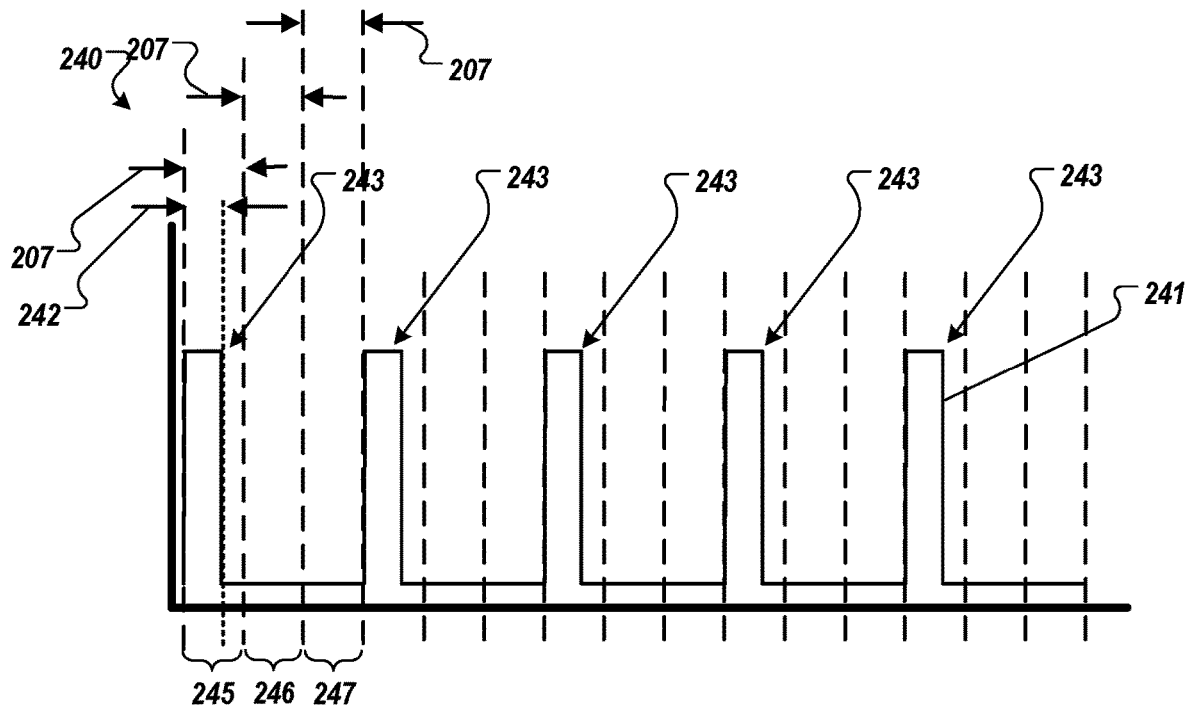
FIG. 2C is a graph of an example modified PWM waveform in accordance with some embodiments in this document.

FIG. 2C is a graph 240 of an example modified PWM waveform 241. In some implementations, the modified PWM waveform 241 can be the example modified PWM signal 141 of FIG. 1. In general, the modified PWM waveform 241 can be used to adjust the output of a switching amplifier controllably (e.g., the example switch 112 of FIG. 1) at levels that drive a PWM control signal to PWM duty cycles that are shorter than the minimum turn-off time of the switching amplifier. In general, this is accomplished by transmitting a PWM pulse during a first PWM cycle and then withholding, blocking, skipping, or otherwise preventing the transmission of PWM pulses for a predetermined number of subsequent PWM cycles before transmitting another PWM pulse.

In the illustrated example, the PWM waveform 241 includes a PWM cycle 245 having the PWM cycle period 207 and a PWM pulse duration 242 that defines a PWM pulse 243. At the start of the PWM cycle 245, the PWM waveform 241 is brought high (e.g., signal power is turned on), and when the predetermined PWM cycle period 207 has elapsed the PWM waveform 241 is brought low (e.g., signal power is turned off) and remains low until the PWM cycle period 207 has elapsed. However, unlike the example normal PWM waveform 201 of FIG. 2A, the modified PWM waveform 241 does not immediately repeat itself. Instead, the PWM waveform 241 remains low during a skipped PWM cycle 246 and a skipped PWM cycle 247, each of which has the PWM cycle period 207, before going high again for another PWM pulse duration equal to the PWM pulse duration 242.

In the illustrated example, the PWM cycle 245 is followed by two skipped PWM cycles 246 and 247. In some implementations, an appropriate number of PWM cycles may be skipped before another PWM pulse 243 is provided (e.g., 2, 3, 5, 10, 20, or more skipped cycles). In some implementations, the number of skipped PWM cycles can be determined dynamically, e.g., the number of skipped PWM cycles can be based on the PWM duty cycle or on a comparison of the PWM pulse duration 242 and the minimum turn-off time.

For example, for PWM duty cycles that cause PWM pulse durations nearly equal to the minimum turn-off time of the switch (e.g., the example switch 112 of FIG. 1), zero skipped PWM cycles may be used, which would cause the switch to output an amplified PWM signal having approximately the minimum turn-off time. In another example, for PWM duty cycles that cause PWM pulse durations that are approximately half the minimum turn-off time of the switch, one skipped PWM cycle may be used between each pulsed PWM cycle, which would cause the switch to output an amplified PWM signal having half as many pulses per second, and would result in an amplified output that is approximately half of the output having zero skipped cycles. In yet another example, for PWM duty cycles that cause PWM pulse durations that are approximately one-third of the minimum turn-off time of the switch, two skipped PWM cycles may be used, which would cause the switch to output an amplified PWM signal having approximately one-third as many pulses per second, and would result in an amplified output that is approximately one-third of the output having zero skipped cycles.

In another example, the PWM driver 110 can be equipped to account for changes in the DC resistance of motor coils in the load 102, and/or to account for changes in current command value (e.g., the number of frame skips may be increased as values of current command shrink). In a particular example, the voltage supply $V_s$ and the nominal DC resistance can be known and fixed. For a maximum current Imax=$V_s$/(DC resistance), and assuming a 100% duty ratio, gives a voltage of $V_s$ across the torque motor winding. For a given current command $I_{cmd}$, the required duty ratio is estimated as DR=$I_{cmd}/I_{max}$. In examples in which DC resistance changes with temperature or from motor to motor, then such variables can be measured or estimated first. The calculation of the number of sample periods to skip n cycles can be as follows:

1. The MOSFET turn-on time $T_{on\_min}$=22 nsec corresponds to a duty ratio $DR_{on\_min}$=0.00022.
2. The MOSFET turn-off time $T_{off\_min}$=2 usec corresponds to a duty ratio $DR_{off\_min}$=0.02.
3. The PWM period $T_{pwm}$=100 usec and is fixed.
4. For a given duty ratio command of DR (=$T_{on}/T_{pwm}$) where 0.00022<DR≤0.02, we have to "skip" n−1 frames when the DR is commanded to be zero. To determine n note that:
   a. $(T_{on}+T_{off\_min})/(n*T_{pwm})$ can equal $T_{on}/T_{pwm}$.
   b. Hence n=$(T_{on}+T_{off\_min})/T_{on}$
   c. Dividing numerator and denominator by $T_{pwm}$ we get: n=$(DR+DR_{off\_min})/DR$
   d. The result can be rounded up to the nearest integer so that it can work with a frame counter.

Figure 2D:
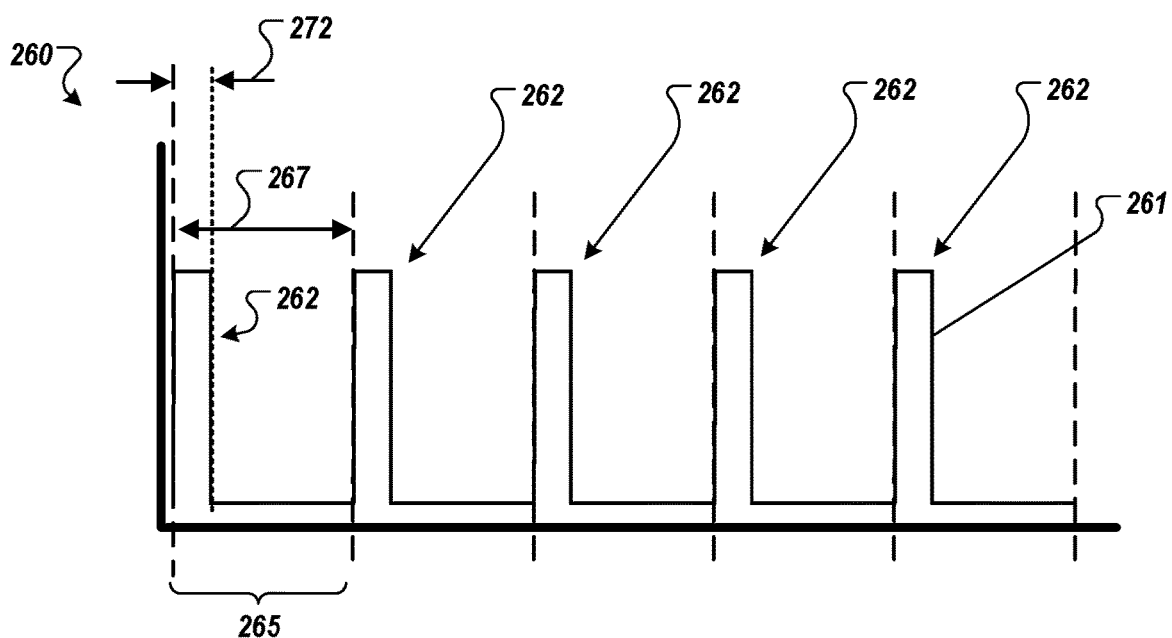
FIG. 2D is a graph of another example modified PWM waveform in accordance with some embodiments in this document.

FIG. 2D is a graph 260 of another example modified PWM waveform 261. In some implementations, the modified PWM waveform 261 can be the example modified PWM signal 141 of FIG. 1. In some implementations, the modified PWM waveform 261 can be the example modified PWM waveform 241 of FIG. 2C, but produced by a different technique. In general, whereas the modified PWM waveform 241 is produced by providing one PWM cycle with a pulse, followed by one or more cycles in which the pulse is kept low, blocked, or otherwise not be provided, the modified waveform 261 is produced by dynamically altering the PWM cycle frequency.

As discussed previously, when PWM duty cycles shorten to a PWM duration that is approximately equal to the minimum turn-off time of the switch (e.g., the example switch 112 of FIG. 1), the amplified pulses output by the switch cannot be made shorter. In the illustrated example, instead of implementing skipped PWM cycles in order to further reduce the output of the switch (e.g., as was done in the example waveform 241), the PWM frequency of the PWM waveform 261 is reduced by a predetermined amount.

The PWM waveform 261 is made up of a collection of repeating PWM cycles 265. Each of the PWM cycles 265 has a PWM cycle period 267, and for non-zero values each PWM cycle 265 includes one PWM pulse 262 having a PWM pulse duration 272.

In the illustrated example, the PWM cycle period 267 is approximately 3× longer than the example PWM cycle period 207 of FIGS. 2A and 2C, while the PWM pulse duration is not expanded (e.g., the PWM duty cycle is reduced by approximately one third to offset the lengthened PWM cycle period 267). For example, if the PWM cycle period 207 is 100 ms and with a duty cycle of 10%, then the PWM pulse duration 242 will be 10 ms. Continuing this example, if the PWM cycle period 267 is expanded to 300 ms, then the PWM pulse duration 242 can be kept at approximately 10 ms. By dynamically reducing the PWM frequency, the PWM waveform 261 can be used to provide switched, amplified outputs that are representative of PWM duty cycles that are shorter than what the minimum turn-off time of the switch would otherwise permit.

In the illustrated example, the PWM frequency has been reduced by approximately one-third, but in other examples any appropriate reduction may be used. For example, the PWM frequency (e.g., and the resulting amplified output) can be reduced by approximately one-half (e.g., compared to the example PWM waveform 201) by setting the PWM cycle period 267 to be twice as long as the example PWM cycle period 207. In other examples, any appropriate length of PWM cycle period can be used, such as 1.25×, 2×, 2.5×, 3×, 5×, or 10× the duration of the PWM cycle period of the normal (e.g., unmodified) PWM signal.

In FIGS. 2A-2D, the PWM waveforms were illustrated and described as being edge-aligned waveforms (e.g., in which the pulses' leading edges are aligned with the start of the PWM cycle). However, PWM signals, including those described in this document, are not limited to edge-aligned signals. For example, the systems and techniques described in this document can be adapted for use with center-aligned PWM waveforms (e.g., in which the pulse is appears to be symmetrically aligned with the center of the PWM cycle), or any other appropriate edge or offset for the timing and/or alignment of PWM pulses and PWM cycles.

Figure 3:
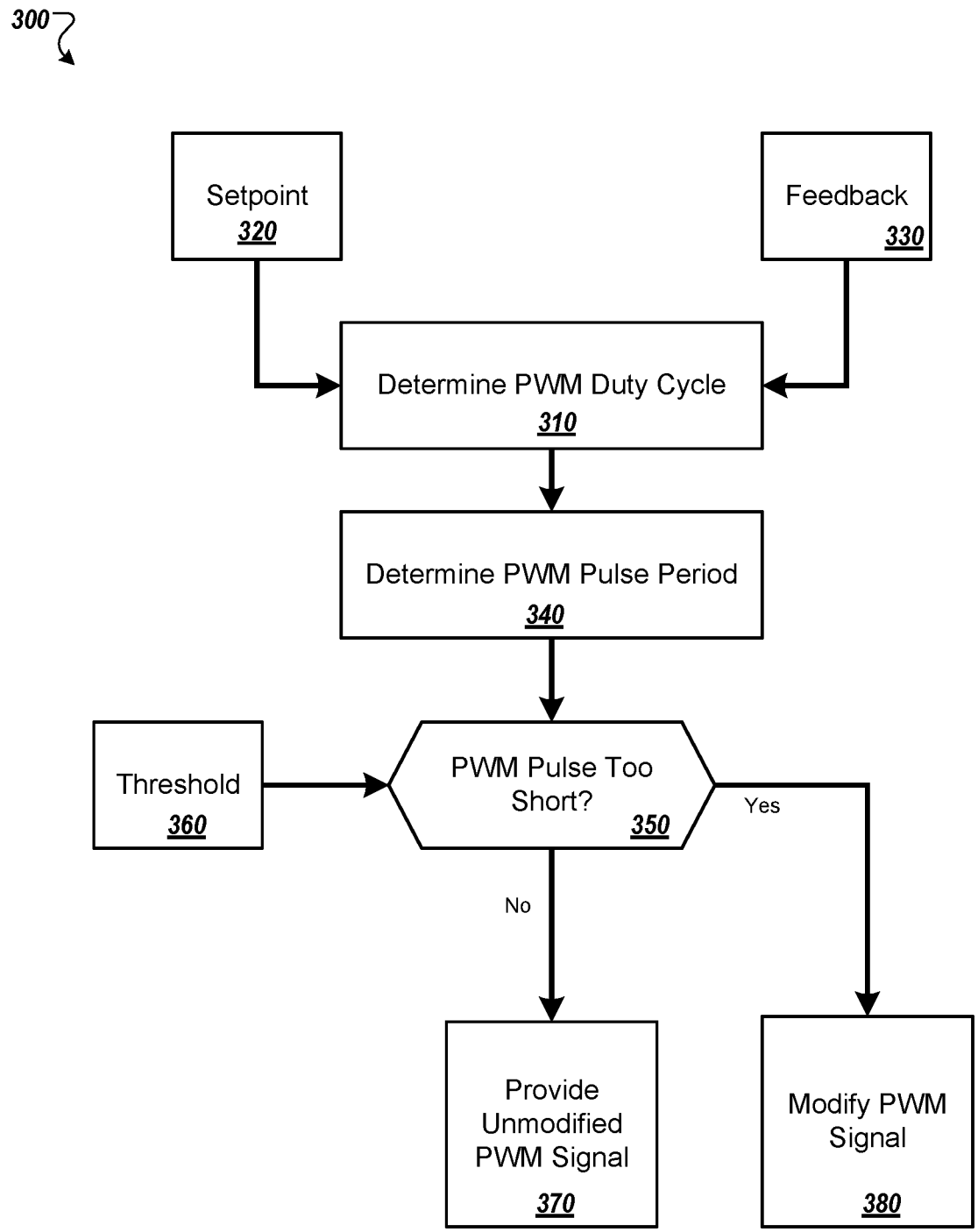
FIG. 3 is a flow diagram that shows an example process for determining an operational condition in which a PWM or modified PWM signal can be provided.

FIG. 3 is a flow diagram that shows an example process 300 for determining an operational condition in which a PWM or modified PWM signal can be provided. In some implementations, the process 300 can be performed by the example PWM controller 110 of FIG. 1.

At 310, a PWM duty cycle is determined based on a setpoint 320 and a collection of feedback information 330. For example, a PWM duty cycle can be selected based on a target output for the example switch 112 of FIG. 1, and on information about the example electrical load 102 that is being driven, directly or indirectly, by the output of the switch 112.

At 340, a PWM pulse width is determined based on the determined PWM duty cycle. The PWM signal repeats on a predetermined or measurable interval of time, and the PWM duty cycle represents a fractional portion of that interval. The resulting portion is the PWM pulse duration. For example, a 10 Hz PWM signal with 50% duty cycle will have pulses that are 0.05 s long and repeat every 0.1 s.

At 350, a determination is made based on the determined PWM pulse duration and a predetermined threshold value 360. The threshold value 360 is based on the minimum turn-off time for a switch (e.g., solid-state device, transistor, IGBT, MOSFET) that will amplify the PWM signal. If the PWM pulse duration is approximately equal to or longer than a period of time determined from the threshold value 360 (e.g., the PWM pulses have a length that will not be affected by minimum turn-off times for the switch), then at 370 an unmodified (e.g., normal) PWM signal is provided to the switch (e.g., the normal PWM signal generator 130 is used to provide the normal PWM signal 131 to the switch 112). If the PWM pulse duration is shorter than the period of time determined from the threshold value 360, then at 380 a modified PWM signal is provided to the switch (e.g., the modified PWM signal generator 140 is used to provide the modified PWM signal 141 to the switch 112).

Figure 4:
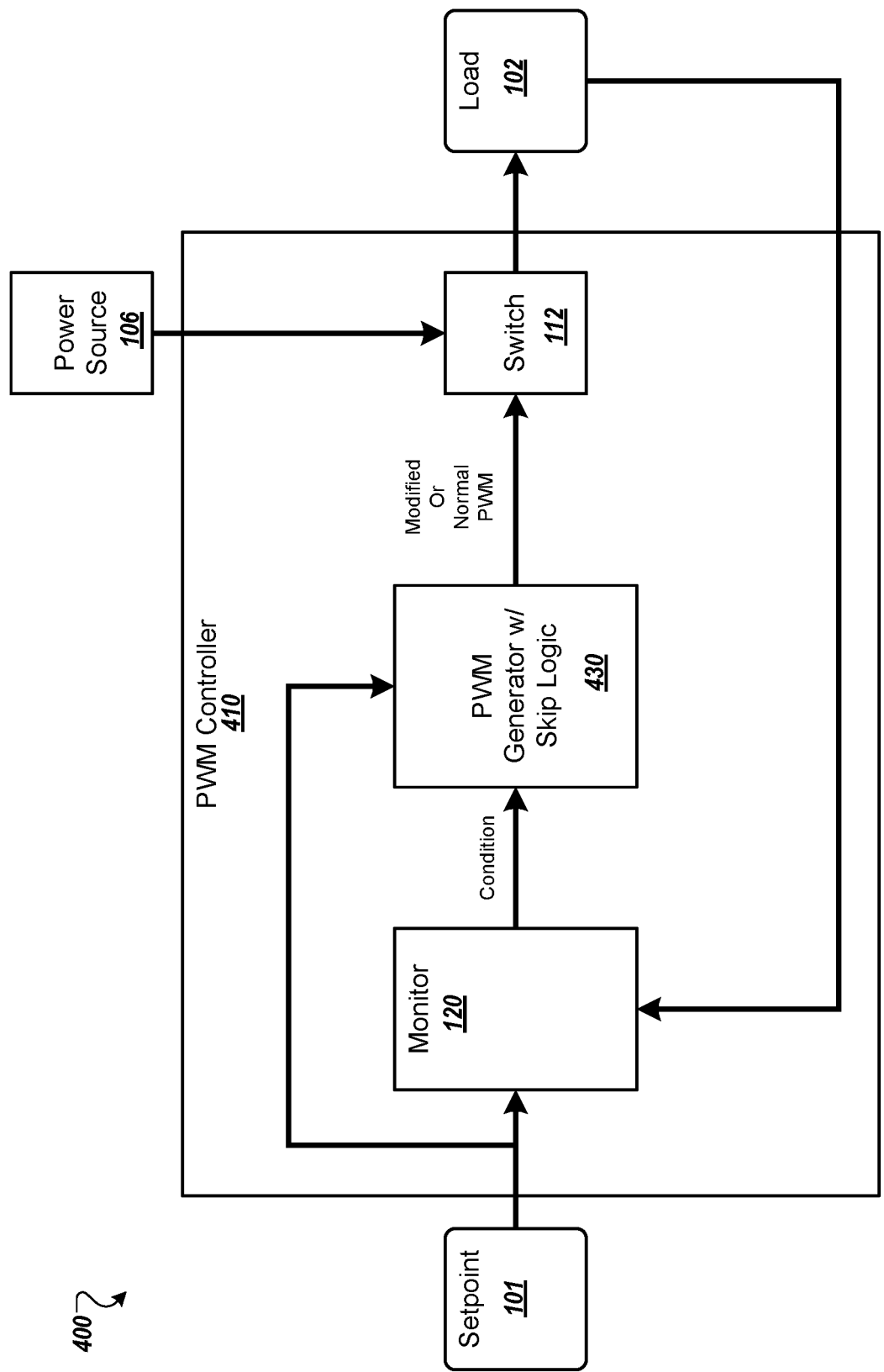
FIG. 4 is a schematic diagram that shows an example of another system for pulse width modulation (PWM) control in accordance with some embodiments in this document.

FIG. 4 is a schematic diagram that shows an example of another system 400 for pulse width modulation (PWM) control. In some embodiments, the system 400 can be a modification or more specific configuration of the example system 100 of FIG. 1.

The system 400 includes a PWM controller 410. In the illustrated example, a PWM signal generator 430 is configured to generate either a normal PWM signal (e.g., with a pulse for each cycle) or a modified PWM signal (e.g., with one pulse per a selected number of cycles, or a reduced frequency signal) based on the setpoint value 101 and an operational condition, determined by the monitor module 120 based on the setpoint value 101. The selected type of PWM signal is provided to the switch 112 to control a flow of power from the power source 106 to the electrical load 102.

Figure 5:
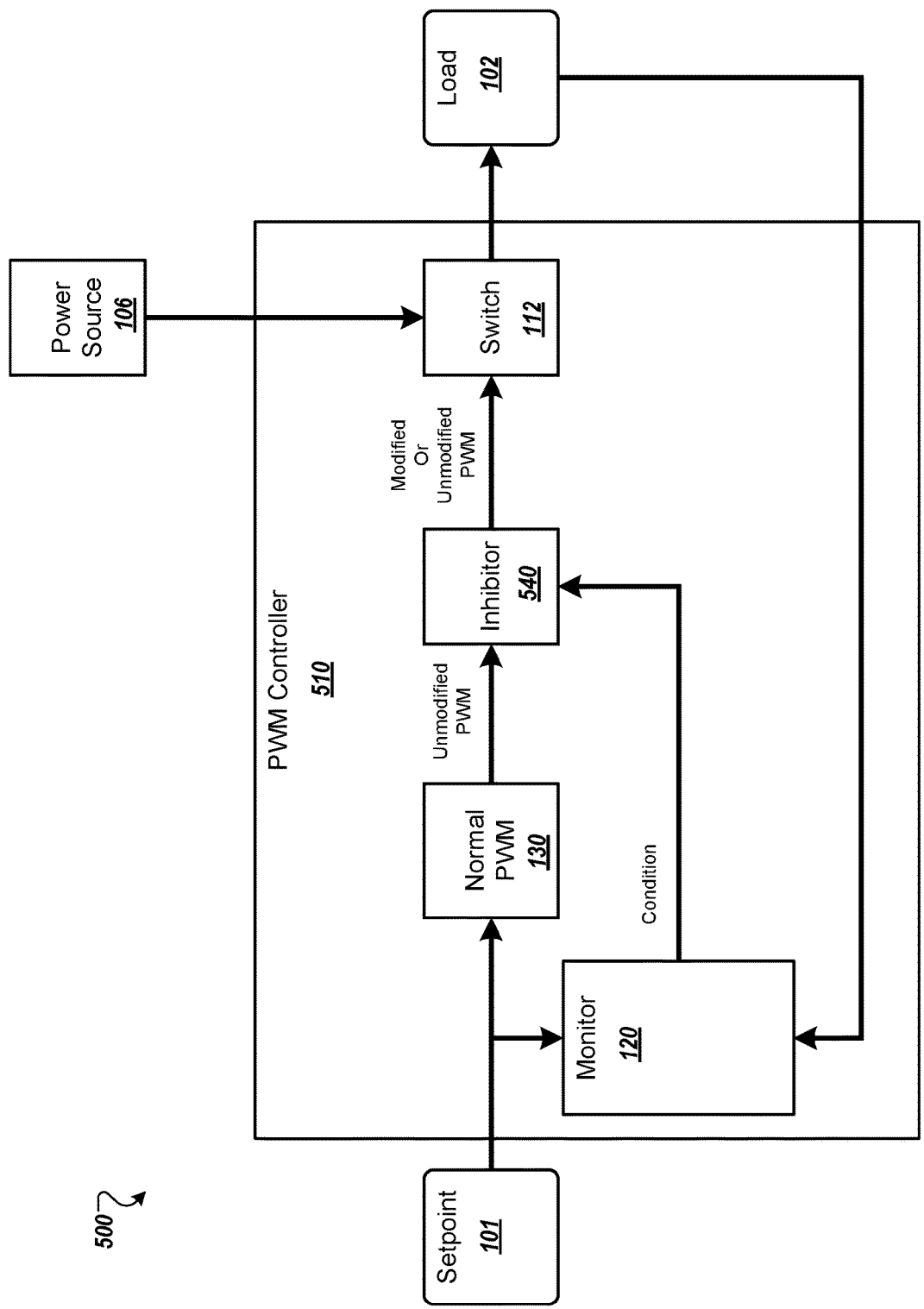
FIG. 5 is a schematic diagram that shows an example of another system for pulse width modulation.

FIG. 5 is a schematic diagram that shows an example of another system 500 for pulse width modulation control. In some embodiments, the system 500 can be a modification or more specific configuration of the example system 100 of FIG. 1.

The system 500 includes a PWM controller 510. In the illustrated example, the normal PWM signal generator 130 is configured to always produce an unmodified PWM signal (e.g., the normal PWM signal 131) based on the setpoint value 101. The monitor module 120 is configured to determine an operational condition based on the setpoint. For example, the monitor module 120 can be configured to determine if the setpoint will give rise to a PWM duty cycle that will have PWM pulse durations that are either equal or longer than the minimum turn-off time of the switch 112, or PWM pulse duration that are shorter than the minimum turn-off time of the switch 112.

A pulse inhibitor module 540 is configured to selectably modify the unmodified PWM signal provided by the PWM signal generator 130 or allow the unmodified PWM signal to remain unmodified, based on the operational condition determined by the monitor module 120. Under operational conditions in which the frequency and the duty cycle of the unmodified PWM signal is determined (e.g., by the monitor module 120) to cause PWM pulses that are either equal or longer than the minimum turn-off time of the switch 112, then the pulse inhibitor module 540 can remain inactive and allow the unmodified PWM signal (e.g., the normal PWM signal 131) to pass to the switch 112.

Under operational conditions in which the frequency and the duty cycle of the unmodified PWM signal is determined (e.g., by the monitor module 120) to cause PWM pulses that are shorter than the minimum turn-off time of the switch 112, then the pulse inhibitor module 540 can activate to modify the unmodified PWM signal, and pass the resulting modified PWM signal (e.g., the modified PWM signal 141) to the switch 112. For example, the pulse inhibitor module 540 may be configured to turn on and off in synchronization with the PWM cycle durations to allow selected PWM cycles to pass to the switch 112 and inhibit or otherwise prevent other cycles from passing.

In operation, the pulse inhibitor module 540 can be configured to inhibit or otherwise block the transmission of a selected number of subsequent PWM cycles for each PWM cycle that it is configured to pass. For example, the pulse inhibitor module 540 can be configured allow a PWM cycle and its PWM pulse to pass to the switch 112, and then block the next four PWM cycles before passing another PWM cycle and its PWM pulse before inhibiting the transmission of another subsequent four skipped cycles. In other examples, the pulse inhibitor module 540 can be configured to skip zero, one, two, three, four, ten, twenty, or any other appropriate number of PWM cycles.

In the illustrated example, the pulse inhibitor module 540 is configured to controllably pass and block low-level PWM pulses before they reach the switch 112 for amplification. In some embodiments, the pulse inhibitor module 540 can be configured to controllably pass and block high-level PWM signals. For example, the pulse inhibitor module 540 can be arranged to controllably pass and block the output of the switch 112.

In the illustrated example, the pulse inhibitor module 540 is included as part of the PWM controller 510. In some embodiments, the pulse inhibitor module 540 and/or the monitor module 120 can be external to the PWM controller 510. For example, an existing (e.g., normal) PWM signal generator may be retrofitted or otherwise supplemented with the monitor module 120 to detect operational conditions based on the setpoint value 101, and the pulse inhibitor module 540 can be arranged between the switch 112 and the electrical load 102. In such arrangements, the pulse inhibitor module 540 can be configured to controllably pass or block amplified PWM signals as they travel from the PWM controller 510 to the electrical load 102.

Figure 6:
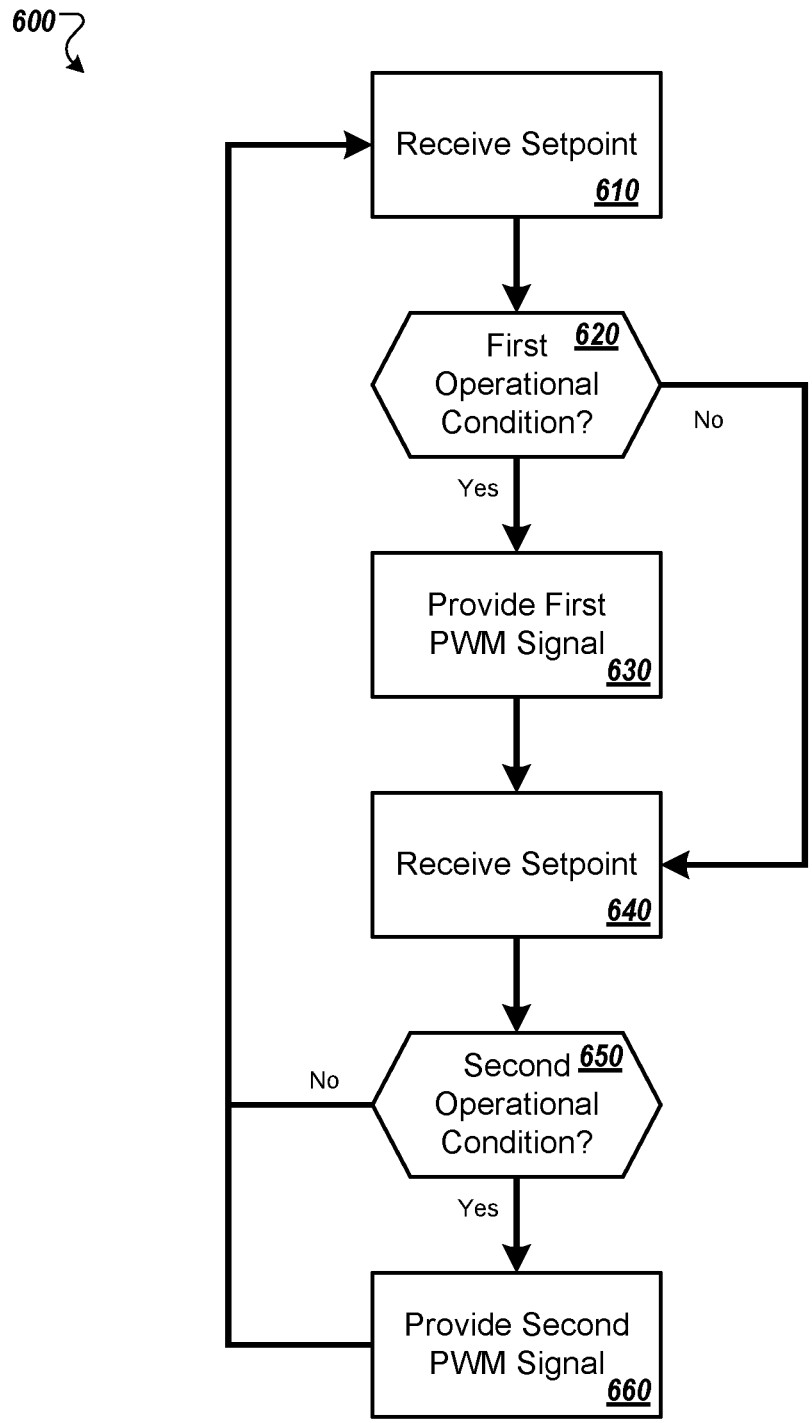
FIG. 6 is a flow chart of an example process for PWM control in accordance with some embodiments in this document.

FIG. 6 is a flow chart of an example process 600 for PWM control in accordance with some embodiments in this document. In some implementations, the process 600 can be performed by the example system 100, 400, and/or 500 of FIGS. 1, 4, and 5.

At 610, a first electrical current output setpoint is received. For example, the example setpoint value 101 is received by the PWM controller 110.

At 620, a determination is made. If a first operational condition is not identified based on the first electrical current output setpoint, then the process continues at 640. If a first operational condition is identified based on the first electrical current output setpoint, then the process continues at 630.

In some implementations, identifying the first operational condition can be based on determining a target duty cycle based on the first electrical current output setpoint, determining that the target duty cycle is equal to or longer than a predetermined threshold duty cycle, and providing the target duty cycle as the first predetermined duty cycle. For example, the monitor module 120 can determine, based on the switch parameters 103, whether or not the setpoint value 101 will result in a PWM signal having a PWM duty cycle that results in PWM pulses that are approximately equal to or longer than the minimum turn-off time of the switch 112.

At 630, a first pulse width modulated (PWM) signal having a first predetermined duty cycle is provided based on the identified first operational condition. The first PWM signal is based on the first electrical current output setpoint, and is provided on a predetermined period. For example, the normal PWM signal generator 130 can be used to generate the normal PWM signal 131 when the PWM pulse durations are approximately equal to or longer than the minimum turn-off time of the switch 112.

In some implementations, providing the first PWM signal can include determining a start of a PWM cycle having a first duration of time based on the predetermined period, providing an electrical signal, halting the electrical signal based on determining that the electrical signal has been provided for a second duration of time, based on the first predetermined duty cycle, has elapsed, and determining an end of the PWM cycle based on determining that the first duration of time has elapsed. For example, the example PWM waveform 201 includes the repeating collection of PWM cycles 205 having the PWM cycle period 207. The start of the cycle 205 can be determined, and the output signal can be turned on. The output signal is kept on until the end of the PWM pulse duration 215, and the turned off for the remainder of the PWM cycle period 207.

At 640, a second electrical current output setpoint is received. In some implementations, the second output setpoint can be the first output setpoint.

At 650, another determination is made. If a second operational condition, different from the first operational condition, is not identified based on the second electrical current output setpoint, then the process continues at 610. If a second operational condition is identified based on the second electrical current output setpoint, then the process continues at 660.

In some implementations, identifying the second operational condition can be based on determining a target duty cycle based on the second electrical current output setpoint, determining that the target duty cycle is shorter than a predetermined threshold duty cycle, and determining the second predetermined duty cycle based on the target duty cycle. In some implementations, identifying the second operational condition can be based on at least one of a minimum turn-off time of an electrical circuit configured to transmit the PWM signal, and a minimum turn-on time of the electrical circuit. For example, the monitor module 120 can determine, based on the switch parameters 103, whether or not the setpoint value 101 will result in a PWM signal having a PWM duty cycle that results in PWM pulses that are shorter than the minimum turn-off time of the switch 112.

At 660, a second PWM signal is provided, based on the identified second operational condition. The second PWM signal has a second predetermined duty cycle, based on the second electrical current output setpoint, and is provided on a predetermined multiple of the predetermined period. For example, the modified PWM signal generator 140 can be used to generate the modified PWM signal 141 when the PWM pulse durations are shorter than the minimum turn-off time of the switch 112.

In some implementations, providing the second PWM signal can include generating a PWM pulse at a frequency based on the predetermined period, transmitting an electrical pulse based on the generated PWM pulse, and ignoring a predetermined number of PWM pulses based on the predetermined multiple. For example, one of the example PWM pulses 243 can be generated during each PWM cycle 245, and no PWM pulse is generated during the PWM cycles 246 and 247. In some implementations, PWM pulses can be ignored by configuring a PWM signal generator to not produce the pulses to be ignored or skipped. In some implementations, a PWM generator can produce pulses for every PWM cycle, but a filter (e.g., the pulse inhibitor module 540) can block or otherwise effectively prevent selected ignored or skipped pulses from reaching an amplification stage (e.g., the switch 112).

In some implementations, providing the second PWM signal can include determining a start of a PWM cycle having a second duration of time based on the predetermined period and the predetermined multiple, providing an electrical signal, halting the electrical signal based on determining that the electrical signal has been provided for a second duration of time, based on the second predetermined duty cycle, has elapsed, and determining an end of the PWM cycle based on determining that the second duration of time has elapsed. For example, the modified PWM waveform 261 of FIG. 2D can be provided, in which the example PWM cycle period 265 has a duration that is a predetermined multiple (e.g., three) of the example PWM cycle period 207.

Figure 7:
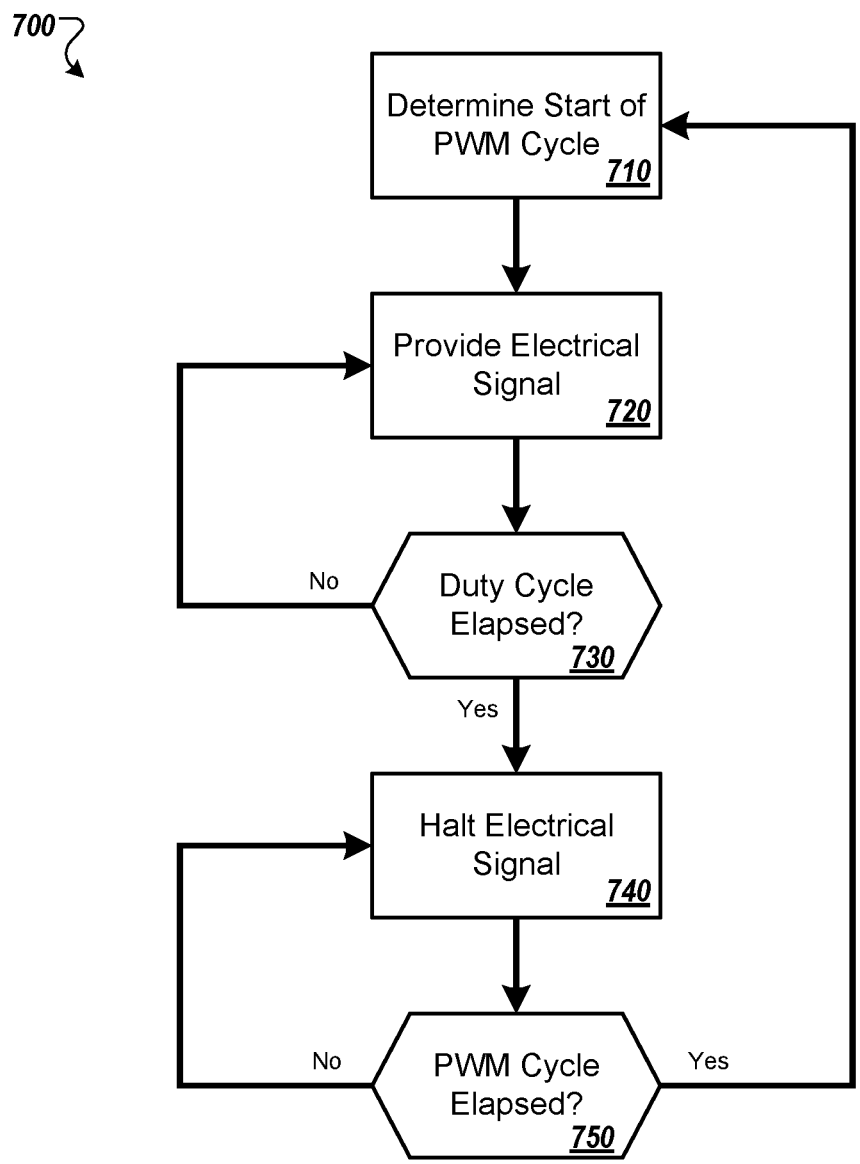
FIG. 7 is a flow chart of an example process for providing a PWM signal in accordance with some embodiments in this document.

FIG. 7 is a flow chart of an example process 700 for providing a PWM signal in accordance with some embodiments in this document. In some implementations, the process 700 can be performed by the example system 100, 400, and/or 500 of FIGS. 1, 4, and 5, for example, to produce the example normal PWM waveform 241 of FIG. 2C. In some implementations, the process 700 can be performed as at least part of step 630 of the example process 600 of FIG. 6.

At 710 a start of a first PWM cycle having a first duration of time based on the predetermined period is determined. For example, the start of the PWM cycle 245 having the PWM cycle period 207 can be determined or detected.

At 720, an electrical signal is provided. For example, the output of the modified PWM signal generator 140 can be turned on or set high to start the PWM pulse 210.

At 730 a determination is made, based on determining that a second duration of time has elapsed. For example, the determination can be based on whether or not the PWM pulse duration 207 has elapsed. If the second duration of time has not elapsed, then the process 700 continues at 720. If the second duration of time has elapsed, then the process 700 continues at 740.

At 740 the electrical signal halted, based on determining that the second duration of time has elapsed. For example, the output of the modified PWM signal generator 130 can be turned off or set low when the PWM pulse duration 215 has elapsed to end the PWM pulse 210.

At 750 another determination is made based on determining whether or not the first duration of time has elapsed. For example, if the PWM cycle period 207 has not elapsed, the PWM signal is kept low and the process continues at 740. If the PWM cycle period 207 has elapsed, then the process 700 continues at 710.

Figure 8:
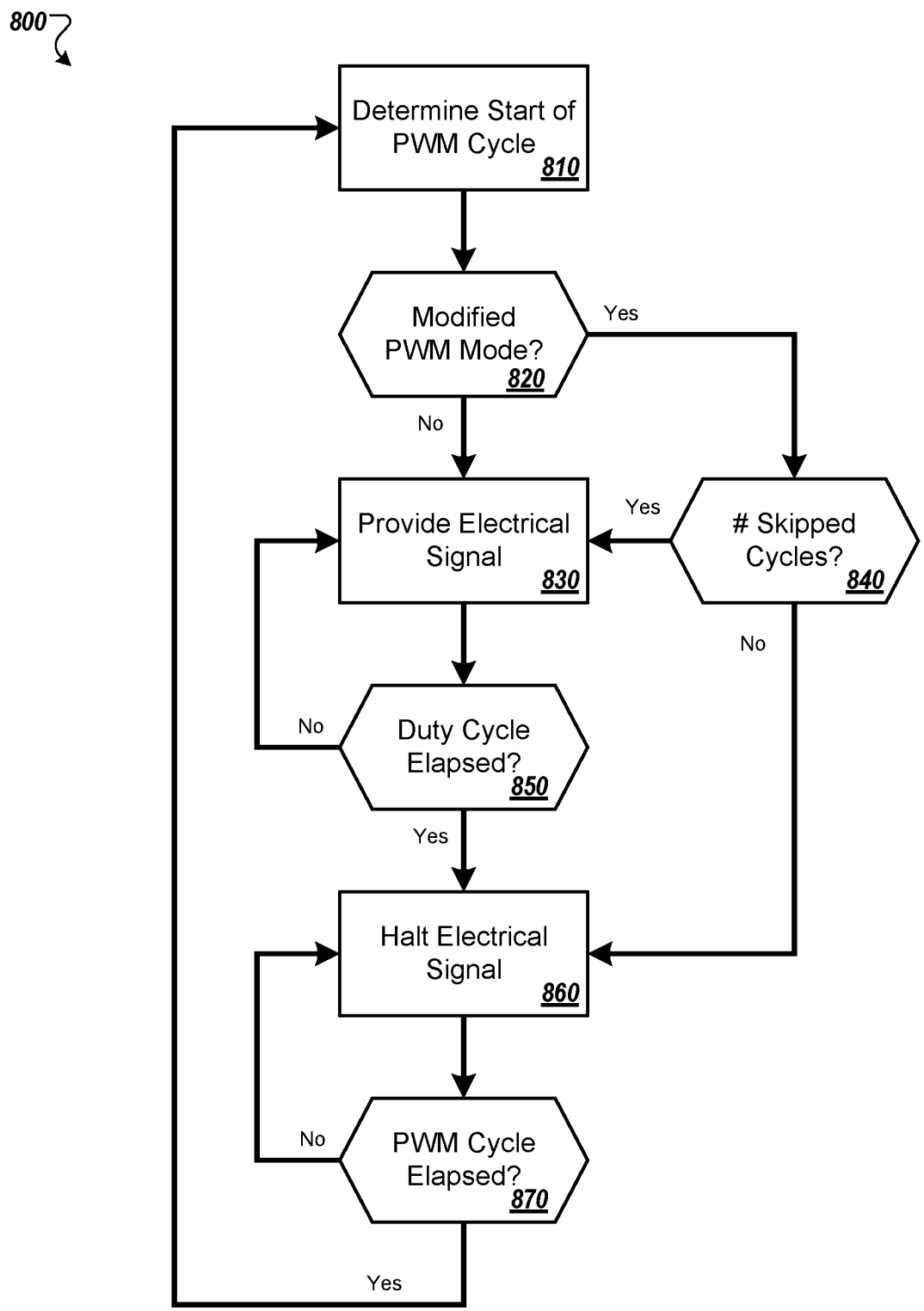
FIG. 8 is a flow chart of another example process for modifying a PWM signal in accordance with some embodiments in this document.

FIG. 8 is a flow chart of an example process 800 for modifying a PWM signal. In some implementations, the process 800 can be performed by the example system 100, 400, and/or 500 of FIGS. 1, 4, and 5, for example, to produce the example modified PWM waveform 241 of FIG. 2C. In some implementations, the process 700 can be performed as at least part of step 660 of the example process 600 of FIG. 6.

At 810, a start of a first PWM cycle having a first duration of time based on the predetermined period is determined. For example, the start of the example PWM cycle 205 of FIG. 2A or the example PWM cycle 245 of FIG. 2C can be identified.

At 820, a determination is made. If PWM signals are to be produced in an unmodified (e.g., normal) mode, then the process 800 continues at 830. If PWM signals are to be produced in a modified mode, the process 800 continues at 840.

At 830, an electrical signal is provided. For example, the example PWM pulse 210, 224, and 243 of FIGS. 2A-2D can be started (e.g., the signal power can be turned on).

At 850 a determination is made. If the duty cycle of the PWM signal has not elapsed, then the process continues at 830. For example, if the example PWM pulse durations 215, 226, and 242 have not expired, then their respective PWM pulses 210, 224, and 243 are left turned on. If the duty cycle of the PWM signal has elapsed, then the process continues at 860.

At 860, the electrical signal is halted based on determining that a second duration of time has elapsed. The second duration of time is based on the first predetermined duty cycle or the second predetermined duty cycle (e.g., whichever was most recently determined from the setpoint value 101). For example, the example PWM pulses 210, 224, and 243 can be turned off when their respective PWM pulse durations 215, 226, and 242 have expired.

At 870, another determination is made based on the PWM cycle duration. If the PWM cycle duration has not expired, the process 800 continues at 860 and the PWM signal level is kept low. If the PWM cycle duration has expired, the process 800 continues at 810. For example, the example, the example PWM waveforms 201 and 241 can kept low or off for the remainder of their respective PWM cycle period 207.

If the process 800 is operating in a modified mode, the determination at 870 can include determining an end of the first PWM cycle based on determining that the first duration of time has elapsed. For example, if a modified PWM waveform is to include four skipped cycles for each pulsed (e.g., non-skipped) cycle, then the end of the pulsed cycle can be identified as the end of the first PWM cycle.

When the process 800 is determined, at 820, to be operating in a modified PWM mode, the process continues at 840. At 840, another determination is made about the number of PWM cycles to skip, ignore, block, or otherwise not provide a corresponding PWM pulse. The start of a predetermined number, based on the predetermined multiple, of second PWM cycles having the first duration of time based on the predetermined period is determined, for example, by determining that a PWM pulse was sent in the previous cycle and resetting a skipped cycle counter. If the predetermined number of cycles has not occurred, then the process continues at 860 where the PWM signal output is set or kept low, and stays low until the cycle is complete. The process of keeping the PWM output low continues until the predetermined number of skipped cycles is determined to have been performed at step 840. If the predetermined number of skipped cycles have occurred, then the process continues at 830, where the next PWM pulse is started.

In some implementations, the process 800 can also include determining the predetermined multiple based on the second operational condition. For example, the setpoint value 101 can be analyzed to determine if zero, one, two, three, four, seven, thirteen, or any other appropriate number of cycles are to be provided without corresponding PWM pulses following a provided PWM pulse.

Figure 9:
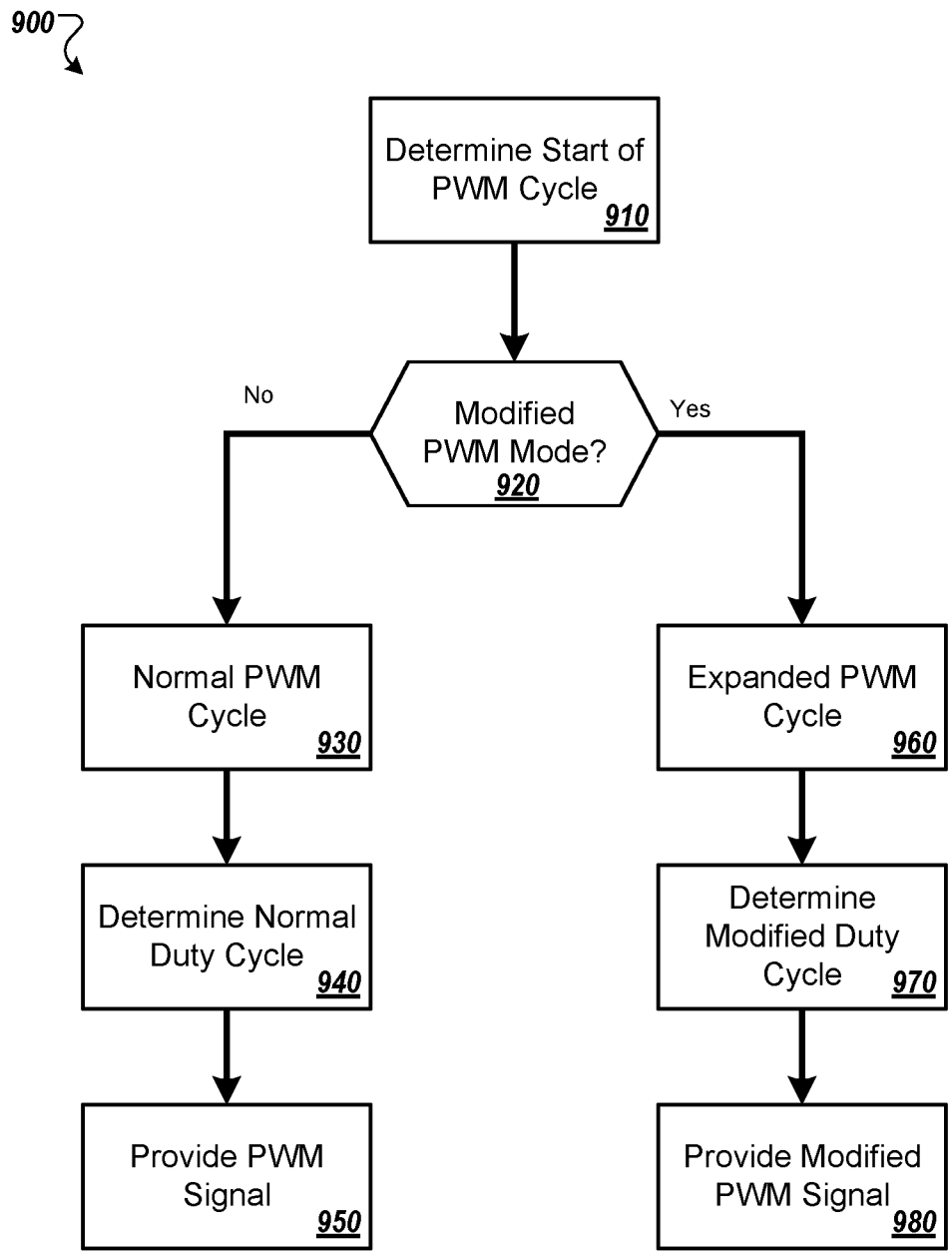
FIG. 9 is a flow chart of another example process for modifying a PWM signal in accordance with some embodiments in this document.

FIG. 9 is a flow chart of an example process 900 for modifying a PWM signal. In some implementations, the process 900 can be performed by the example system 100, 400, and/or 500 of FIGS. 1, 4, and 5, for example, to produce the example modified PWM waveform 261 of FIG. 2D.

At 910, the start of a PWM cycle is determined. For example, the start of the example PWM cycle 205 of FIG. 2A or the example PWM cycle 265 of FIG. 2D can be identified.

At 920, a determination is made. If a modified PWM output is not needed (e.g., the PWM pulse duration is long enough for the switch 112 to replicate accurately), then the process continues at 930. If a modified PWM output is needed (e.g., the PWM pulse duration is too short for the switch 112 to replicate accurately), then the process 900 continues at 960

At 930, the process 900 begins to operate in a "normal" PWM mode. At 940, a normal (e.g., unmodified) PWM duty cycle is determined for an output signal, and at 950 the normal PWM signal is provided (e.g., to the example switch 112 of FIG. 1).

At 960, the process 900 begins to operate in a "modified" PWM mode. At 970, a modified PWM duty cycle is determined. For example, the example PWM cycle period 207 can be expanded to become the example PWM cycle period 267. In some examples, the example PWM duty cycle can be modified to provide the example PWM pulse duration 272 (e.g., to proportionally offset the expanded PWM cycle). In some implementations, step 970 can effectively reduce the frequency of the PWM signal by a predetermined amount (e.g., based on the setpoint value 101, the switch parameters 103, and/or the feedback from the electrical load 102). At 980, the modified signal is provided (e.g., to the switch 112).

Figure 10:
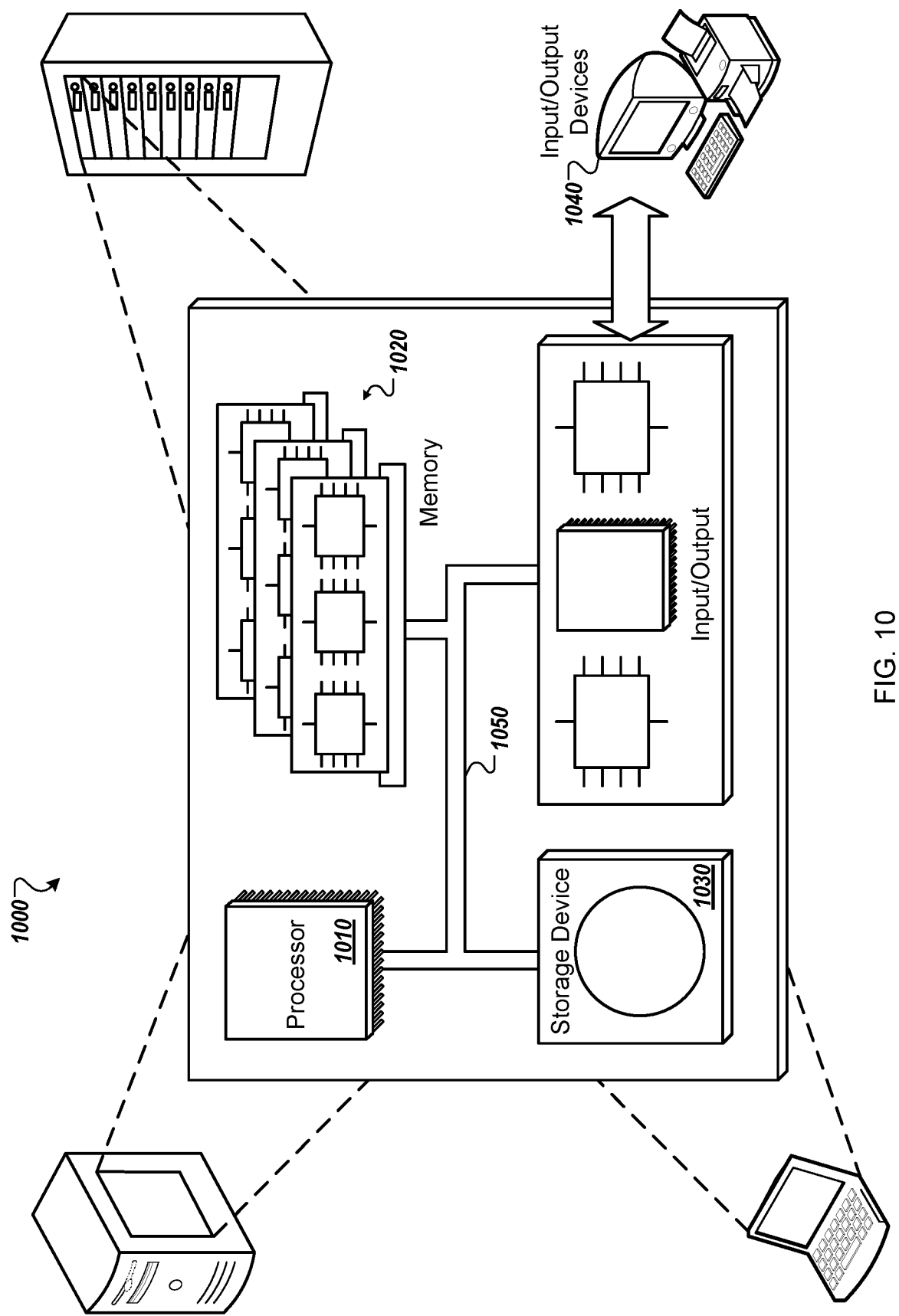
FIG. 10 is a schematic diagram of an example of a generic computer system.

FIG. 10 is a schematic diagram of an example of a generic computer system 1000. The system 1000 can be used for the operations described in association with the example process 300 according to one implementation. For example, the system 1000 may be included in either or all of the PWM controller 110, the PWM controller 410, and the PWM controller 510.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be is a non-volatile memory unit, a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for electric current control, comprising:
   receiving, by a controller configured to output pulse width modulation (PWM) signals, a first electrical current output setpoint;
   identifying, by the controller, a first operational condition based on the first electrical current output setpoint;
   providing, by the controller to an electrical load and based on the identified first operational condition, a first PWM signal having a first predetermined duty cycle, based on the first electrical current output setpoint, provided on a predetermined period;
   receiving, by the controller, a second electrical current output setpoint;
   identifying, by the controller, a second operational condition different from the first operational condition based on the second electrical current output setpoint; wherein identifying the second operational condition is based on at least one of a minimum turn-on time of an electrical circuit configured to transmit the PWM signal, and a minimum turn-off time of the electrical circuit, and wherein identifying the second operational condition comprises determining that at least one PWM signal transmitted by the controller is equal to or less than at least one of the minimum turn-on time or the minimum turn-off time of the electrical circuit; and
   providing, by the controller to the electrical load and based on the identified second operational condition, a second PWM signal having a second predetermined duty cycle different from the first predetermined duty cycle, based on the second electrical current output setpoint, provided on a predetermined multiple of the predetermined period.

2. The computer-implemented method of claim 1, wherein providing the first PWM signal comprises:
   determining a start of a PWM cycle having a first duration of time based on the predetermined period;
   providing an electrical signal;

halting the electrical signal based on determining that the electrical signal has been provided for a second duration of time, based on the first predetermined duty cycle, has elapsed; and determining an end of the PWM cycle based on determining that the first duration of time has elapsed.

3. The computer-implemented method of claim 1, wherein providing the second PWM signal comprises:

determining a start of a first PWM cycle having a first duration of time based on the predetermined period;

providing an electrical signal;

halting the electrical signal based on determining that a second duration of time, based on the second predetermined duty cycle, has elapsed;

determining an end of the first PWM cycle based on determining that the first duration of time has elapsed;

determining the start of a predetermined number, based on the predetermined multiple, of second PWM cycles having the first duration of time based on the predetermined period;

halting the electrical signal during the second PWM cycles; and determining the end of the predetermined number of second PWM cycles have occurred.

4. The computer-implemented method of claim 3, further comprising determining the predetermined multiple based on the second operational condition.

5. The computer-implemented method of claim 1, wherein providing the second PWM signal comprises:

determining a start of a PWM cycle having a second duration of time based on the predetermined period and the predetermined multiple;

providing an electrical signal;

halting the electrical signal based on determining that a second duration of time, based on the second predetermined duty cycle, has elapsed; and determining an end of the PWM cycle based on determining that the second duration of time has elapsed.

6. The computer-implemented method of claim 1, wherein providing the second PWM signal comprises:

generating a PWM pulse at a frequency based on the predetermined period;

transmitting an electrical pulse based on the generated PWM pulse; and ignoring a predetermined number of PWM pulses based on the predetermined multiple.

7. The computer-implemented method of claim 1, wherein identifying the first operational condition is based on:

determining a target duty cycle based on the first electrical current output setpoint;

determining that the target duty cycle is equal to or longer than a predetermined threshold duty cycle; and providing the target duty cycle as the first predetermined duty cycle.

8. The computer-implemented method of claim 1, wherein identifying the second operational condition is based on:

determining a target duty cycle based on the second electrical current output setpoint;

determining that the target duty cycle is shorter than a predetermined threshold duty cycle; and determining the second predetermined duty cycle based on the target duty cycle.

9. The computer-implemented method of claim 1, wherein providing the second PWM signal comprises skipping a transmission of a predetermined number of PWM pulses before transmitting a next PWM pulse.

10. The computer-implemented method of claim 1, wherein the controller comprises an operational condition identification module, a threshold module, a normal signal generator module, and a modified signal generator module, wherein providing the first PWM signal comprises providing the first PWM signal by the normal signal generator module, and wherein providing the second PWM signal comprises providing the second PWM signal by the modified signal generator module.

11. The computer-implemented method of claim 10, wherein the threshold module is connected with the operational condition identification module, the normal signal generator module, and the modified signal generator module, and wherein identifying the second operational condition comprises determining, by the threshold module, that the at least one PWM signal is equal to or less than the at least one of the minimum turn-on time or the minimum turn-off time of the electrical circuit, and wherein providing the second PWM signal comprises engaging the modified signal generator module to provide the second PWM signal, and the engaging comprises engaging the modified signal generator module as a function of determining that at least one PWM signal transmitted by the controller is equal to or less than the at least one of the minimum turn-on time or the minimum turn-off time of the electrical circuit.

12. A control system comprising:

an input configured to receive electrical current setpoints;

a monitor circuit configured to identify at least a first operational condition and a second operational condition based on received electrical current setpoints;

a pulse generator configured to generate an electrical pulse width modulated (PWM) signal comprising a plurality of PWM pulses based on received electrical current setpoints and provide the PWM signal on a predetermined period;

a pulse inhibitor configured to modify the PWM signal by passing the PWM pulses to an electrical load based on the first operational condition, and by blocking selected PWM pulses of the PWM signal and passing non-selected PWM pulses to the electrical load based on the second operational condition, wherein the non-selected PWM pulses are provided to the electrical load on a predetermined multiple of the predetermined period; and a transmitter configured to transmit the modified PWM signal to the electrical load, wherein the monitor circuit is configured to identify the second operational condition based on at least one of a minimum turn-on time of an electrical circuit configured to transmit the PWM signal, and a minimum turn-off time of the electrical circuit, and wherein identifying the second operational condition comprises determining that at least one PWM signal transmitted by the controller is equal to or less than at least one of the minimum turn-on time or the minimum turn-off time of the electrical circuit.

13. The control system of claim 12, wherein the first operational condition is identified based on a first electrical current setpoint and the second operational condition is identified based a second electrical current setpoint, and the pulse generator is further configured to generate a first PWM signal based on the first electrical current setpoint and generate a second PWM signal based on the second electrical current setpoint.

14. The control system of claim 12, wherein the first operational condition is identified based on a first electrical current setpoint and the second operational condition is identified based on a second electrical current setpoint, and the monitor circuit is further configured to identify a first operational condition based on the first electrical current setpoint and identify a second operational condition based on the second electrical current setpoint.

15. The control system of claim 12, wherein the monitor circuit is configured to identify one or both of the first operational condition and the second operational condition further based on one or more operational inputs that are descriptive of the electrical load or operation of the electrical load, wherein operation of the electrical load is controlled based on the PWM signal.

16. The control system of claim 12, wherein the pulse inhibitor is configured to modify operation of the pulse generator to cause the pulse generator to withhold generation of selected PWM pulses of the PWM signal.

17. The control system of claim 12, wherein the pulse inhibitor is configured to modify operation of the pulse generator to cause the pulse generator to modify a frequency of the PWM signal.

18. The control system of claim 12, wherein the pulse inhibitor is configured to block selected PWM pulses generated by the pulse generator.

19. The control system of claim 12, wherein the selected PWM pulses are a predetermined number of sequential PWM pulses.

20. The control system of claim 19, wherein the predetermined number of sequential PWM pulses is based on the second operational condition.

21. A non-transitory computer storage medium encoded with a computer program, the computer program comprising instructions that when executed by data processing apparatus cause the data processing apparatus to perform operations comprising:
receiving, by a controller configured to output pulse width modulation (PWM) signals, a first electrical current output setpoint;
identifying, by the controller, a first operational condition based on the first electrical current output setpoint;
providing, by the controller to an electrical load and based on the identified first operational condition, a first PWM signal having a first predetermined duty cycle, based on the first electrical current output setpoint, provided on a predetermined period;
receiving, by the controller, a second electrical current output setpoint;
identifying, by the controller, a second operational condition different from the first operational condition based on the second electrical current output setpoint, wherein identifying the second operational condition is based on at least one of a minimum turn-on time of an electrical circuit configured to transmit the PWM signal, and a minimum turn-off time of the electrical circuit, and wherein identifying the second operational condition comprises determining that at least one PWM signal transmitted by the controller is equal to or less than at least one of the minimum turn-on time or the minimum turn-off time of the electrical circuit; and
providing, by the controller to the electrical load and based on the identified second operational condition, a second PWM signal having a second predetermined duty cycle different from the first predetermined duty cycle, based on the second electrical current output setpoint, provided on a predetermined multiple of the predetermined period.

22. The non-transitory computer storage medium of claim 21, wherein providing the first PWM signal comprises:
determining a start of a PWM cycle having a first duration of time based on the predetermined period;
providing an electrical signal;
halting the electrical signal based on determining that a second duration of time, based on the first predetermined duty cycle, has elapsed; and
determining an end of the PWM cycle based on determining that the first duration of time has elapsed.

23. The non-transitory computer storage medium of claim 21, wherein providing the second PWM signal comprises:
determining a start of a first PWM cycle having a first duration of time based on the predetermined period;
providing an electrical signal;
halting the electrical signal based on determining that a second duration of time, based on the second predetermined duty cycle, has elapsed;
determining an end of the first PWM cycle based on determining that the first duration of time has elapsed;
determining the start of a predetermined number, based on the predetermined multiple, of second PWM cycles having the first duration of time based on the predetermined period;
halting the electrical signal during the second PWM cycles; and
determining the end of the predetermined number of second PWM cycles have occurred.

24. The non-transitory computer storage medium of claim 23, the operations further comprising determining the predetermined multiple based on the second operational condition.

25. The non-transitory computer storage medium of claim 21, wherein providing the second PWM signal comprises:
determining a start of a PWM cycle having a second duration of time based on the predetermined period and the predetermined multiple;
providing an electrical signal;
halting the electrical signal based on determining that a second duration of time, based on the second predetermined duty cycle, has elapsed; and
determining an end of the PWM cycle based on determining that the second duration of time has elapsed.

26. The non-transitory computer storage medium of claim 21, wherein providing the second PWM signal comprises:
generating a PWM pulse at a frequency based on the predetermined period;
transmitting an electrical pulse based on the generated PWM pulse; and
ignoring a predetermined number of PWM pulses based on the predetermined multiple.

27. The non-transitory computer storage medium of claim 21, wherein identifying the first operational condition is based on:
determining a target duty cycle based on the first electrical current output setpoint;
determining that the target duty cycle is equal to or longer than a predetermined threshold duty cycle; and
providing the target duty cycle as the first predetermined duty cycle.

28. The non-transitory computer storage medium of claim 21, wherein identifying the second operational condition is based on:

determining a target duty cycle based on the second electrical current output setpoint;
determining that the target duty cycle is shorter than a predetermined threshold duty cycle; and
determining the second predetermined duty cycle based on the target duty cycle.

\* \* \* \* \*